US012624643B2

(12) United States Patent
Hardikar et al.

(10) Patent No.: US 12,624,643 B2
(45) Date of Patent: May 12, 2026

(54) ROTARY MACHINE SEAL HAVING A WEAR PROTECTION ASSEMBLY WITH AN ABRADABLE COVERING

(71) Applicant: General Electric Company, Schenectady, NY (US)

(72) Inventors: Narendra Anand Hardikar, Bengaluru (IN); Scott Alan Schimmels, Miamisburg, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/942,835

(22) Filed: Nov. 11, 2024

(65) Prior Publication Data

US 2025/0067192 A1      Feb. 27, 2025

Related U.S. Application Data

(62) Division of application No. 17/979,113, filed on Nov. 2, 2022, now abandoned.

(51) Int. Cl.
  F01D 11/00          (2006.01)
  F16J 15/3284        (2016.01)
(52) U.S. Cl.
  CPC ......... F01D 11/001 (2013.01); F16J 15/3284 (2013.01); *F05D 2220/32* (2013.01)
(58) Field of Classification Search
  CPC .......................... F01D 11/001; F16J 15/3284
  See application file for complete search history.

(56) References Cited

U.S. PATENT DOCUMENTS

| | | | |
|---|---|---|---|
| 4,478,082 | A | 10/1984 | Sato et al. |
| 5,174,584 | A | 12/1992 | Lahrman |
| 5,975,537 | A | 11/1999 | Turnquist et al. |
| 6,676,369 | B2 | 1/2004 | Brauer et al. |
| 6,758,477 | B2 | 7/2004 | Brauer et al. |
| 6,969,236 | B2 | 11/2005 | Giesler et al. |
| 7,409,319 | B2 | 8/2008 | Kant et al. |
| 8,115,494 | B2 | 2/2012 | Franklin |
| 8,206,083 | B2 | 6/2012 | Garrison |
| 8,682,563 | B2 | 3/2014 | Malcolmson et al. |

(Continued)

FOREIGN PATENT DOCUMENTS

WO      WO8912160 A1    12/1989

*Primary Examiner* — Courtney D Heinle
*Assistant Examiner* — John S Hunter, Jr.
(74) *Attorney, Agent, or Firm* — Dority & Manning, P.A.

(57)      ABSTRACT

A seal assembly for rotary machines having a wear protection assembly with an abradable covering. The wear protection assembly has one or more wear protection features that enable in-operation opening of the seal assembly by increasing a clearance between a seal rotor and a seal slider of the seal assembly. In particular, the wear protection assembly is configured to open the seal assembly and increase the clearance of the seal rotor and the seal slider during slider air-bearing wear conditions, slider counterbore wear conditions, rotor air-bearing wear conditions, or extreme vibration wear conditions. Under such or similar wear conditions (or under conditions preceding or leading up to a wear condition), the wear protection assembly yields a pressure gradient and/or a fluid flow that oppose the forces acting to decrease the clearance between the seal rotor and the seal slider.

14 Claims, 14 Drawing Sheets

(56)            References Cited

U.S. PATENT DOCUMENTS

| | | | |
|---|---|---|---|
| 9,534,502 | B2 | 1/2017 | Thatte et al. |
| 9,645,038 | B2 | 5/2017 | Bird |
| 9,683,454 | B1 | 6/2017 | Welch et al. |
| 9,752,780 | B2 * | 9/2017 | Jones ..................... F23R 3/002 |
| 10,329,938 | B2 | 6/2019 | Prenger et al. |
| 10,385,976 | B2 | 8/2019 | Kurth et al. |
| 10,415,707 | B2 | 9/2019 | Bidkar et al. |
| 10,458,267 | B2 | 10/2019 | Gibson et al. |
| 10,823,184 | B2 | 11/2020 | Sen et al. |
| 10,890,082 | B2 | 1/2021 | Hardikar et al. |
| 10,895,324 | B2 | 1/2021 | Tran et al. |
| 10,900,570 | B2 | 1/2021 | Bidkar et al. |
| 10,969,017 | B2 | 4/2021 | Guo et al. |
| 11,028,718 | B2 | 6/2021 | Gibson et al. |
| 11,047,481 | B2 | 6/2021 | Bidkar et al. |
| 2003/0184022 | A1 | 10/2003 | Brauer et al. |
| 2003/0185669 | A1 | 10/2003 | Brauer et al. |
| 2012/0251290 | A1 | 10/2012 | Turnquist et al. |
| 2021/0404348 | A1 | 12/2021 | Buonvino et al. |

* cited by examiner

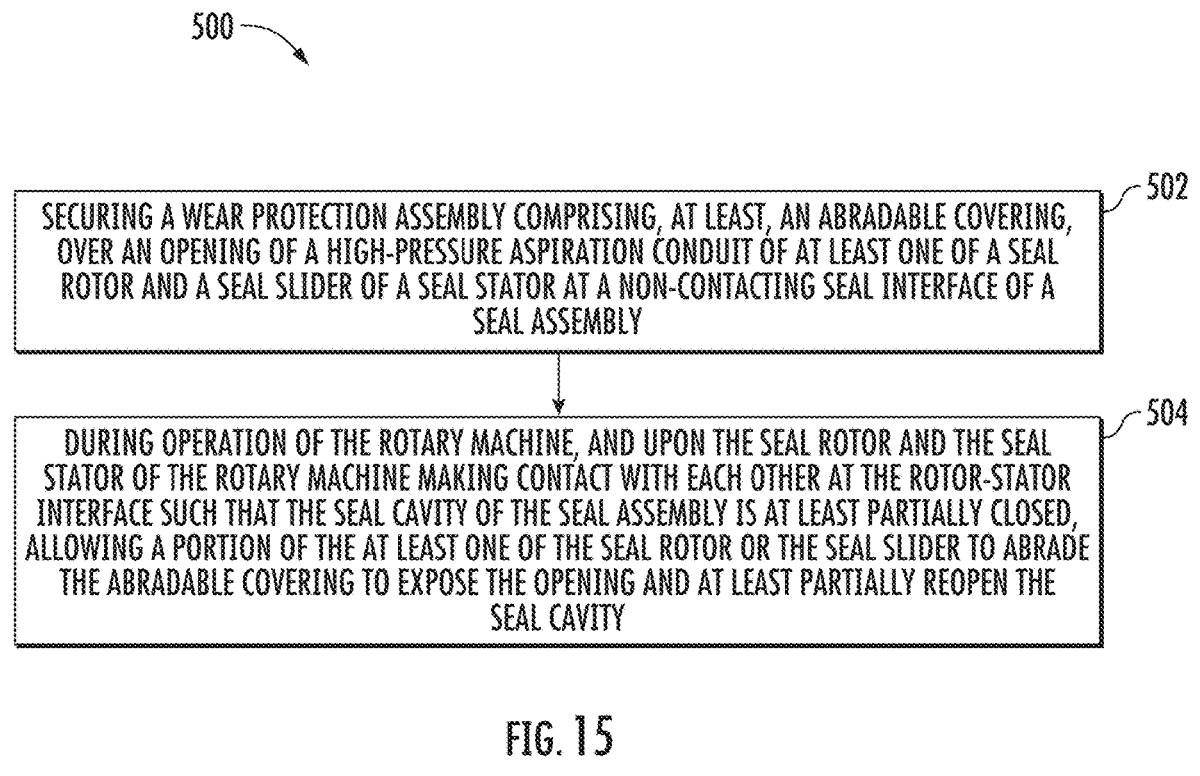

500 ⟍

┌─────────────────────────────────────────────────────────────────────┐ ⟋502
│ SECURING A WEAR PROTECTION ASSEMBLY COMPRISING, AT LEAST, AN ABRADABLE COVERING, │
│ OVER AN OPENING OF A HIGH-PRESSURE ASPIRATION CONDUIT OF AT LEAST ONE OF A SEAL │
│ ROTOR AND A SEAL SLIDER OF A SEAL STATOR AT A NON-CONTACTING SEAL INTERFACE OF A │
│ SEAL ASSEMBLY │
└─────────────────────────────────────────────────────────────────────┘

┌─────────────────────────────────────────────────────────────────────┐ ⟋504
│ DURING OPERATION OF THE ROTARY MACHINE, AND UPON THE SEAL ROTOR AND THE SEAL │
│ STATOR OF THE ROTARY MACHINE MAKING CONTACT WITH EACH OTHER AT THE ROTOR-STATOR │
│ INTERFACE SUCH THAT THE SEAL CAVITY OF THE SEAL ASSEMBLY IS AT LEAST PARTIALLY CLOSED, │
│ ALLOWING A PORTION OF THE AT LEAST ONE OF THE SEAL ROTOR OR THE SEAL SLIDER TO ABRADE │
│ THE ABRADABLE COVERING TO EXPOSE THE OPENING AND AT LEAST PARTIALLY REOPEN THE │
│ SEAL CAVITY │
└─────────────────────────────────────────────────────────────────────┘

FIG. 15

ROTARY MACHINE SEAL HAVING A WEAR PROTECTION ASSEMBLY WITH AN ABRADABLE COVERING

CROSS-REFERENCE TO RELATED APPLICATIONS

This application is a divisional application of U.S. application Ser. No. 17/979,113 filed Nov. 2, 2022, which is hereby incorporated by reference in its entirety.

FIELD

The present disclosure generally relates to rotary machines, and more particularly, to seal assemblies for rotary machines.

BACKGROUND

Gas turbine engines, and other similar rotary machines, generally include a turbine section downstream of a combustion section that is rotatable with a compressor section to rotate and operate the gas turbine engine to generate power, such as propulsive thrust. Typically, the turbine section defines a high pressure turbine in serial flow arrangement with an intermediate pressure turbine and/or low pressure turbine. The high pressure turbine includes an inlet or nozzle guide vane between the combustion section and the high pressure turbine rotor. The nozzle guide vane generally serves to accelerate a flow of combustion gases exiting the combustion section to more closely match or exceed the high pressure turbine rotor speed along a tangential or circumferential direction. Thereafter, turbine sections generally include successive rows or stages of stationary and rotating airfoils, or vanes and blades, respectively.

In addition, rotary machines including turbomachines or gas turbine engines have seals between rotating components (e.g., rotors) and corresponding stationary components (e.g., stators). These seals may help to reduce leakage of fluids between the rotors and stators. These seals may additionally or alternatively help separate fluids that have respectively different pressures and/or temperatures. The sealing properties of a seal may impact not only the amount of leakage and/or separation of fluids, but also the overall operation and/or operating efficiency of the rotary machine.

An example seal in a gas turbine engine is a non-contacting film riding aspirating face seal of the rotor. However, during high vibration, stalls, and/or high thermal gradients (such as burst chop re-burst or high maneuvers), the AFS (aspirating face seal) air bearing can experience metal-to-metal contact between the rotor and the stator, thereby causing rubs and air bearing wear. This may change the seal force balance, thereby causing the seal to run tighter, which can lead to more rubs and wear. Moreover, metal-to-metal contact can generate high heat and temperature rise and potentially initiate cracks that may propagate through the rotor.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 15 shows a flow diagram of a method of reducing wear of a seal assembly of a rotary machine according to an embodiment of the present disclosure.

Figure 1:
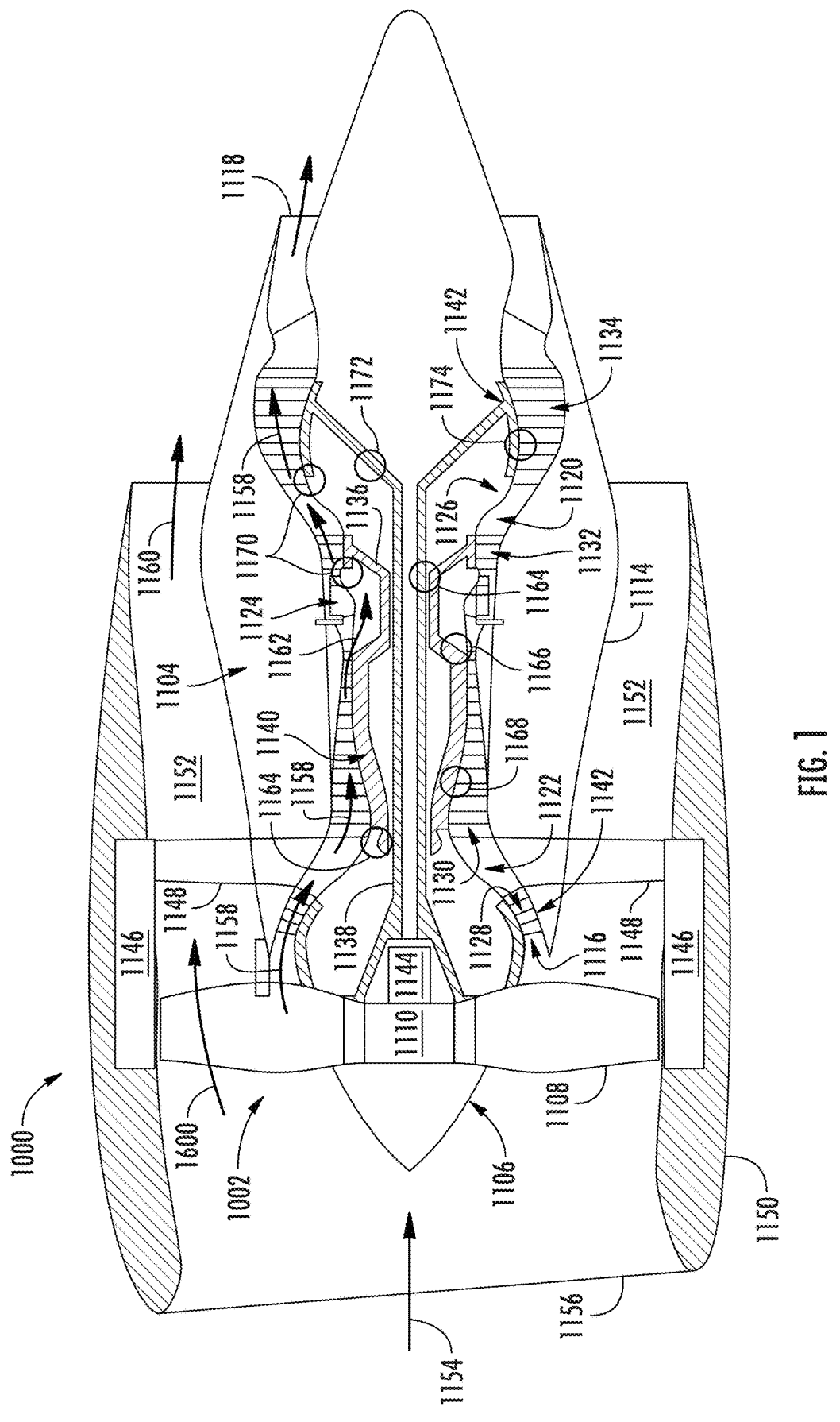
FIG. 1 is a schematic cross-sectional view of a rotary machine that includes a gas turbine engine according to embodiments of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term "stator" refers to any component of a rotary machine, such as a turbine engine, that has a coaxial configuration and arrangement with a rotor of the rotary machine. A stator may be disposed radially inward or radially outward along a radial axis in relation to at least a portion of a rotor. Additionally, or in the alternative, a stator may be disposed axially adjacent to at least a portion of a rotor.

The terms "low" and "high", or their respective comparative degrees (e.g., -er, where applicable), when used with a compressor, a turbine, a shaft, or spool components, etc.

each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled", "fixed", "attached to", and the like refer to both direct coupling, fixing, or attaching, as well as indirect coupling, fixing, or attaching through one or more intermediate components or features, unless otherwise specified herein.

As used herein, the terms "first", "second", "third" and so on may be used interchangeably to distinguish one component from another and are not intended to signify location or importance of the individual components.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting the a second wall/surface).

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally directed to seal assemblies for rotary machines having a wear protection assembly with an abradable covering. The seal assemblies according to embodiments of the present disclosure may be utilized in any rotary machine and, in particular, are suitable for rotary machines including turbomachines and gas turbine engines, and the like. In certain embodiments, the seal assemblies according to the present disclosure include aspirating seals that provide a thin film of pressurized fluid between a face of a seal and a face of a rotor. The thin film of fluid may be provided by one or more aspiration conduits (for example, high-pressure aspiration conduits) that allow fluid, such as pressurized air or gasses within a turbine engine, to flow from a higher-pressure region on one side of the seal assembly to a lower-pressure region on another side of the seal assembly. In other embodiments, the fluid flowing through the aspiration conduits provides a thin film of pressurized fluid between the seal face and the rotor face. The thin film of pressurized fluid may act as a fluid bearing, such as a gas bearing, that inhibits contact between the seal and the rotor. For example, the fluid bearing may be a hydrostatic bearing, an aerostatic bearing, an aerodynamic bearing or a combination of aerostatic and aerodynamic features referred to as a hybrid bearing, or the like.

As such, seal assemblies according to embodiments of the present disclosure are generally considered to be non-contacting seals, in that the fluid bearing generally inhibits contact between the seal face and the rotor face. In particular, the seal assemblies of the present disclosure generally include a primary seal defined by a rotor face of a seal rotor and a slider face of a seal slider. The primary seal may be configured as an aspirating face seal, a fluid bearing, a gas bearing, or the like. In addition, or in the alternative, the primary seal may be configured as a radial film riding seal, an axial film riding seal, a radial carbon seal, an axial carbon seal, or the like.

Under high vibration, stalls, and/or high thermal gradients, however, the non-contacting components can come into contact with each other, thereby causing metal-to-metal rubs and/or bearing wear. This contact may change the seal force balance and may also cause the seal to run tighter, which causes more wear. Hence, rub detection and health monitoring of such seal assemblies is helpful for seal robustness.

Accordingly, the present disclosure is generally directed to seal assemblies for rotary machines having a wear protection assembly with an abradable covering. In certain embodiments, the wear protection assembly has one or more wear protection features that enable in-operation opening (i.e., during operation of the rotary machine) of the seal assembly by increasing a clearance between rotary machine components. In particular, in certain non-limiting examples, the wear protection assembly is configured to open the seal assembly and increase the clearance of rotary machine components during slider air-bearing wear conditions, slider counterbore wear conditions, rotor air-bearing wear conditions, or extreme vibration wear conditions (e.g., vibrations due to sustained, high vibration frequency or aerobatic maneuver events).

Under such or similar wear conditions (or under conditions preceding or leading up to a wear condition), the wear protection assembly yields a pressure gradient and/or a fluid flow that oppose the forces (e.g., weather, vibration, stall, and/or thermal forces) acting to decrease the clearance between the rotary machine components (e.g., between the stator and the rotor tooth).

Referring now to the drawings, FIG. 1 is a schematic cross-sectional view of an embodiment of a rotary machine that includes a gas turbine engine according to the present disclosure, in particular, the rotary machine 1000. The rotary machine 1000 may be mounted to an aircraft, such as in an under-wing configuration or tail-mounted configuration. It will be appreciated that the rotary machine 1000 shown in FIG. 1 is provided by way of example and not to be limiting, and that the subject matter of the present disclosure may be implemented with other types of turbine engines, as well as other types of rotary machines.

In general, the rotary machine 1000 may include a fan section 1002 and a core engine 1104 disposed downstream from the fan section 1002. The fan section 1002 may include a fan 1106 with any suitable configuration, such as a variable pitch, single stage configuration. The fan 1106 may include a plurality of fan blades 1108 coupled to a fan disk 1110 in a spaced apart manner. The fan blades 1108 may extend outwardly from the fan disk 1110 generally along a radial direction. The core engine 1104 may be coupled directly or indirectly to the fan section 1002 to provide torque for driving the fan section 1002.

The core engine 1104 may include an engine case 1114 that encases one or more portions of the core engine 1104, including, a compressor section 1122, a combustion section 1124, and a turbine section 1126. The engine case 1114 may define a core engine inlet 1116, an exhaust nozzle 1118, and a core air flowpath 1120 therebetween. The core air flowpath 1120 may pass through the compressor section 1122, the combustion section 1124, and the turbine section 1126, in serial flow relationship. The compressor section 1122 may include a first, booster or low pressure (LP) compressor 1128 and a second, high pressure (HP) compressor 1130. The turbine section 1126 may include a first, high pressure (HP) turbine 1132 and a second, low pressure (LP) turbine 1134. The compressor section 1122, combustion section 1124, turbine section 1126, and exhaust nozzle 1118 may be arranged in serial flow relationship and may respectively define a portion of the core air flowpath 1120 through the core engine 1104.

The core engine 1104 and the fan section 1002 may be coupled to a shaft driven by the core engine 1104. By way of example, as shown in FIG. 1, the core engine 1104 may include a high pressure (HP) shaft 1136 and a low pressure (LP) shaft 1138. The HP shaft 1136 may drivingly connect the HP turbine 1132 to the HP compressor 1130. The LP shaft 1138 may drivingly connect the LP turbine 1134 to the LP compressor 1128. In other embodiments, a turbine engine may have three shafts, such as in the case of a turbine engine that includes an intermediate pressure turbine. A shaft of the core engine 1104, together with a rotating portion of the core engine 1104, may sometimes be referred to as a "spool." The HP shaft 1136, a rotating portion of the HP compressor 1130 coupled to the HP shaft 1136, and a rotating portion of the HP turbine 1132 coupled to the HP shaft 1136, may be collectively referred to as a high pressure (HP) spool 1140. The LP shaft 1138, a rotating portion of the LP compressor 1128 coupled to the LP shaft 1138, and a rotating portion of the LP turbine 1134 coupled to the LP shaft 1138, may be collectively referred to as low pressure (LP) spool 1142.

In some embodiments, the fan section 1002 may be coupled directly to a shaft of the core engine 1104, such as directly to an LP shaft 1138. Alternatively, as shown in FIG. 1, the fan section 1002 and the core engine 1104 may be coupled to one another by way of a power gearbox 1144, such as a planetary reduction gearbox, an epicyclical gearbox, or the like. For example, the power gearbox 1144 may couple the LP shaft 1138 to the fan 1106, such as to the fan disk 1110 of the fan section 1002. The power gearbox 1144 may include a plurality of gears for stepping down the rotational speed of the LP shaft 1138 to a more efficient rotational speed for the fan section 1002.

Still referring to FIG. 1, the fan section 1002 of the rotary machine 1000 may include a fan case 1146 that at least partially surrounds the fan 1106 and/or the plurality of fan blades 1108. The fan case 1146 may be supported by the core engine 1104, for example, by a plurality of outlet guide vanes 1148 circumferentially spaced and extending substantially radially therebetween. The rotary machine 1000 may include a nacelle 1150. The nacelle 1150 may be secured to the fan case 1146. The nacelle 1150 may include one or more sections that at least partially surround the fan section 1002, the fan case 1146, and/or the core engine 1104. For example, the nacelle 1150 may include a nose cowl, a fan cowl, an engine cowl, a thrust reverser, and so forth. The fan case 1146 and/or an inward portion of the nacelle 1150 may circumferentially surround an outer portion of the core engine 1104. The fan case 1146 and/or the inward portion of the nacelle 1150 may define a bypass passage 1152. The bypass passage 1152 may be disposed annularly between an outer portion of the core engine 1104 and the fan case 1146 and/or inward portion of the nacelle 1150 surrounding the outer portion of the core engine 1104.

During operation of the rotary machine 1000, an inlet airflow 1154 enters the rotary machine 1000 through an inlet 1156 defined by the nacelle 1150, such as a nose cowl of the nacelle 1150. The inlet airflow 1154 passes across the fan blades 1108. The inlet airflow 1154 splits into a core airflow 1158 that flows into and through the core air flowpath 1120 of the core engine 1104 and a bypass airflow 1160 that flows through the bypass passage 1152. The core airflow 1158 is compressed by the compressor section 1122. Pressurized air from the compressor section 1122 flows downstream to the combustion section 1124 where fuel is introduced to generate combustion gasses, as represented by arrow 1162. The combustion gasses exit the combustion section 1124 and flow through the turbine section 1126, generating torque that rotates the compressor section 1122 to support combustion while also rotating the fan section 1002. Rotation of the fan section 1002 causes the bypass airflow 1160 to flow through the bypass passage 1152, generating propulsive thrust. Additional thrust is generated by the core airflow 1158 exiting the exhaust nozzle 1118.

In some exemplary embodiments, the rotary machine 1000 may be a relatively large power class turbine engine that may generate a relatively large amount of thrust when operated at the rated speed. For example, the rotary machine 1000 may be configured to generate from about 300 Kilonewtons (kN) of thrust to about 700 KN of thrust, such as from about 300 kN to about 500 kN of thrust, such as from about 500 kN to about 600 KN of thrust, or such as from about 600 KN to about 700 KN of thrust. However, it will be appreciated that the various features and attributes of the rotary machine 1000 described with reference to FIG. 1 are provided by way of example only and not to be limiting. In fact, the present disclosure may be implemented with respect to any desired turbine engine, including those with attributes or features that differ in one or more respects from the rotary machine 1000 described herein. For example, the present disclosure may be implemented in aircrafts as well as non-aircraft applications.

Still referring to FIG. 1, the rotary machine 1000 includes seal assemblies at a number of locations throughout the turbine engine any one or more of which may be configured according to the present disclosure. A presently disclosed seal assembly may be provided in a rotary machine 1000 at any location that includes an interface with a rotating portion of the rotary machine 1000, such as an interface with a rotating portion or spool of the core engine 1104. For example, a seal assembly may be included at an interface with a portion of the LP spool 1142 and/or at an interface with the HP spool 1140. In some embodiments, a seal assembly may be included at an interface between a spool, such as the LP spool 1142 or the HP spool 1140, a stationary portion of the core engine 1104. Additionally, or in the alternative, a seal assembly may be included at an interface between the LP spool 1142 and the HP spool 1140. Additionally, or in the alternative, a seal assembly may be included at an interface between a stationary portion of the core engine 1104 and the LP shaft 1138 or the HP shaft 1136, and/or at an interface between the LP shaft 1138 and the HP shaft 1136.

By way of example, FIG. 1 illustrates locations where a seal assembly may be situated. Such seal assemblies may be particularly suited, for example, at a rotor-stator interface 201 as described herein and illustrated in detail in FIGS. 10A-14. In another example, a seal assembly may be located at or near a bearing compartment 1164. A seal assembly located at or near the bearing compartment 1164 may sometimes be referred to as a bearing compartment seal. Such a bearing compartment seal may be configured to inhibit air flow, such as core airflow 1158 from passing into a bearing compartment of the rotary machine 1000, such as a bearing compartment located at an interface between the LP shaft 1138 and the HP shaft 1136.

As another example, a seal assembly may be located at or near the compressor section 1122 of the rotary machine 1000. In some embodiments, a seal assembly may be located at or near a compressor discharge 1166, for example, of the HP compressor 1130. A seal assembly located at or near the compressor discharge 1166 may sometimes be referred to as a compressor discharge pressure seal. Such a compressor discharge pressure seal may be configured to maintain pressure downstream of the compressor section 1122 and/or to provide bearing thrust balance. Additionally, or in the alternative, a seal assembly may be located between adjacent compressor stages 1168 of the compressor section 1122. A seal assembly located between adjacent compressor stages 1168 may be sometimes referred to as a compressor interstage seal. Such a compressor interstage seal may be configured to limit air recirculation within the compressor section 1122.

As another example, a seal assembly may be located at or near the turbine section 1126 of the rotary machine 1000. In some embodiments, a seal assembly may be located at or near a turbine inlet 1170, for example, of the HP turbine 1132 or the LP turbine 1134. A seal assembly located at or near a turbine inlet 1170 may sometimes be referred to as a forward turbine seal. Such a forward turbine seal may be configured to contain high-pressure cooling air for the HP turbine 1132 and/or the LP turbine 1134, such as for turbine disks and turbine blades thereof. Additionally, or in the alternative, a seal assembly may be located at or near one or more turbine disk rims 1172. A seal assembly located at or near the turbine disk rim(s) 1172 may sometimes be referred to as a turbine disk rim seal. Such a turbine disk rim seal may be configured to inhibit hot gas ingestion into the disk rim area. Additionally, or in the alternative, a seal assembly may be located between adjacent turbine stages 1174 of the turbine section 1126. A seal assembly located between adjacent turbine stages 1174 may be sometimes referred to as a turbine interstage seal. Such a turbine interstage seal may be configured to limit air recirculation within the turbine section 1126.

A seal assembly at any one or more of these locations or other location of a rotary machine 1000 may be configured in accordance with the present disclosure. Additionally, or in the alternative, the rotary machine 1000 may include a presently disclosed seal assembly at one or more other locations of the rotary machine 1000. It will also be appreciated that the presently disclosed seal assemblies may also be used in other rotary machines, and that the rotary machine 1000 described with reference to FIG. 1 is provided by way of example and not to be limiting.

Now referring to FIGS. 2-9, an embodiments of a seal assembly of a rotary machine or of a component thereof, such as a gas turbine engine, is illustrated. In particular, an embodiment of an aspirating face seal of a gas turbine engine is illustrated, in particular, an aspirating face seal 16 of a gas turbine engine 100. The aspirating face seal 16 is configured to provide a seal interface with a stator and a rotor, such as between a stator 101 and a rotor 105 of the gas turbine engine 100. In the illustrated embodiment, the aspirating face seal 16 is configured as an aspirating gas bearing face seal.

Figure 2:
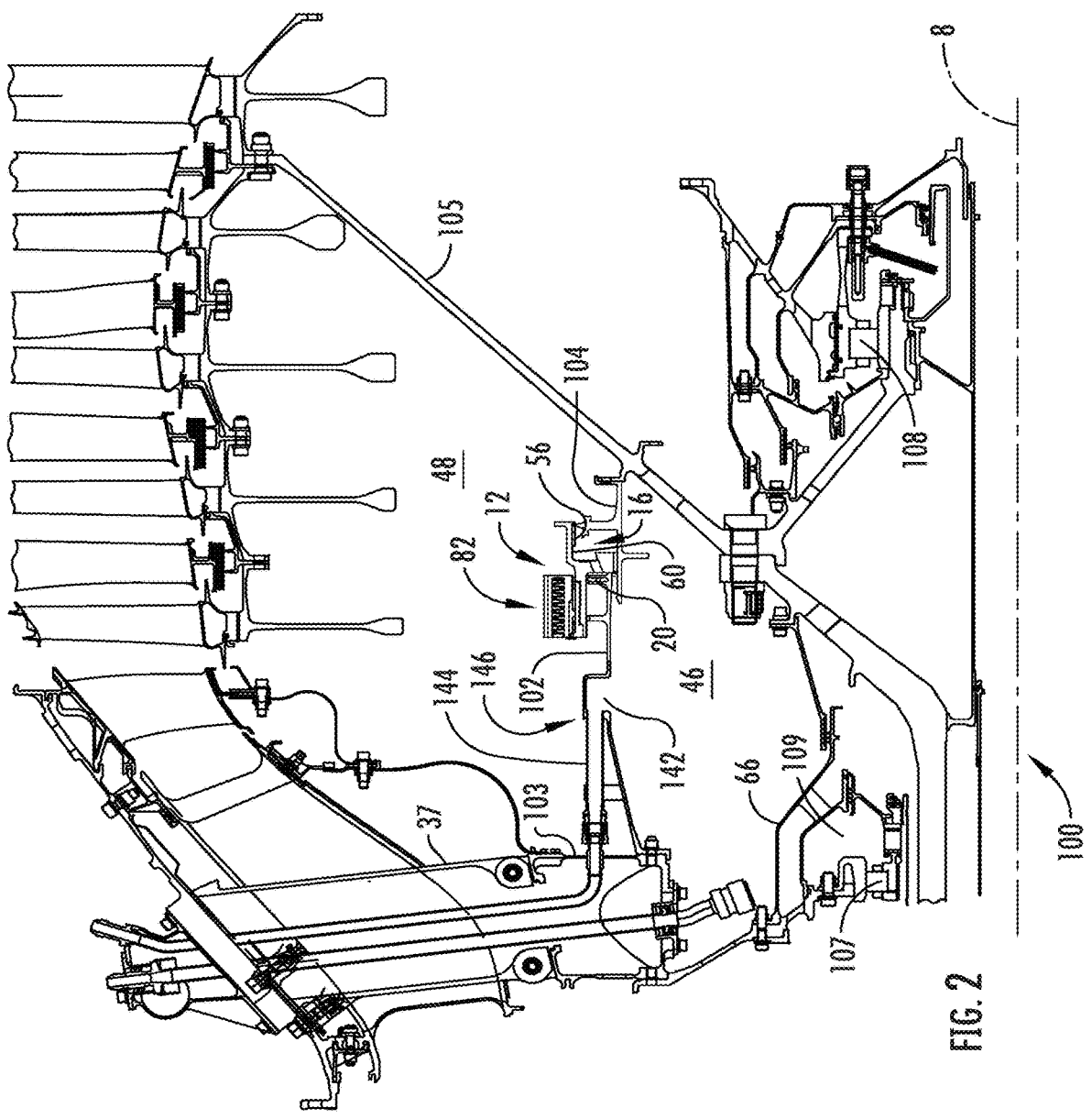
FIG. 2 is a cross-sectional view of a portion of a gas turbine engine that includes a seal or seal assembly according to embodiments of the present disclosure.
Figure 3:
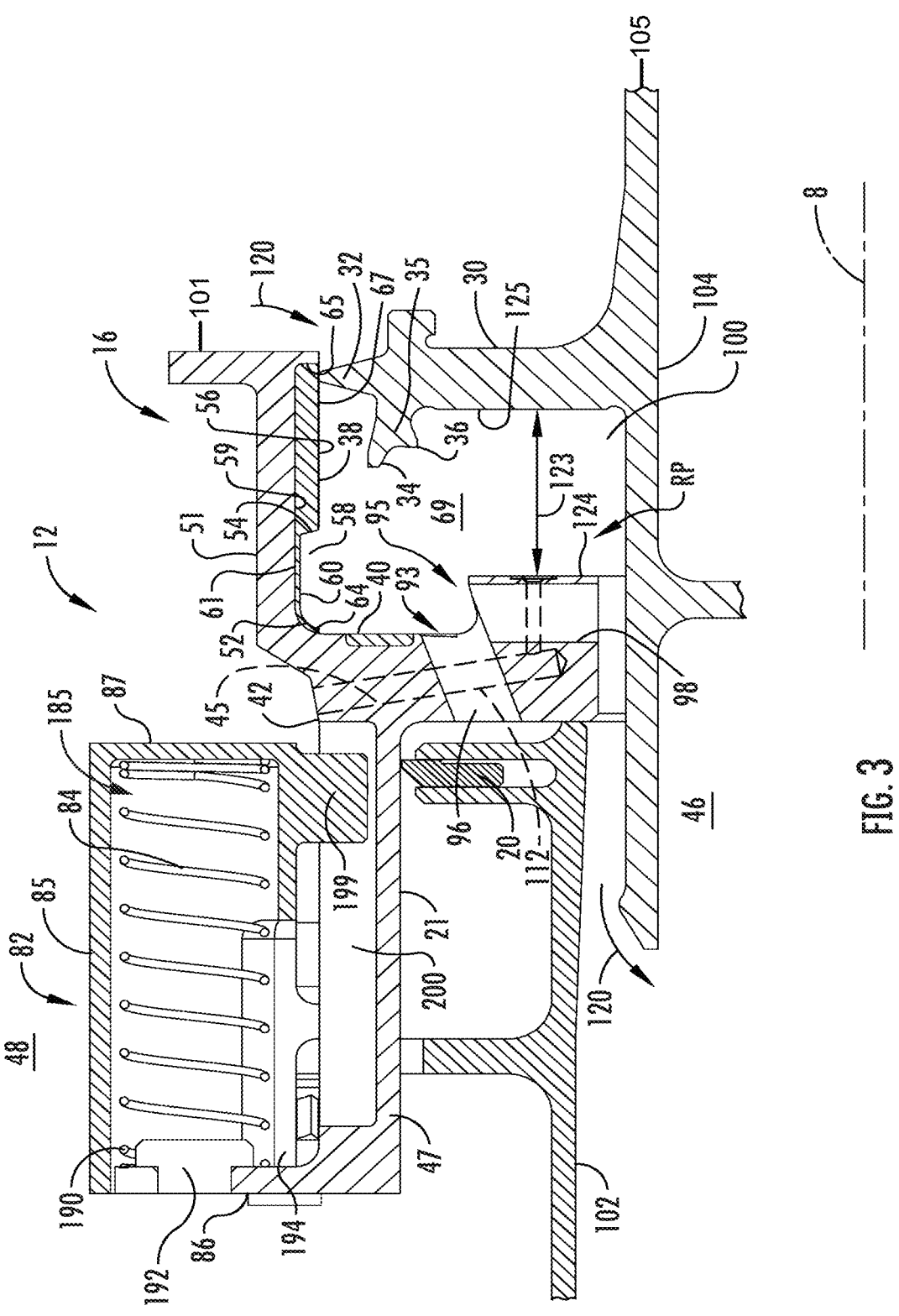
FIG. 3 is an enlarged cross-sectional view of the seal in FIG. 2 in an opened engine off position according to an embodiment of the present disclosure.
Figure 4:
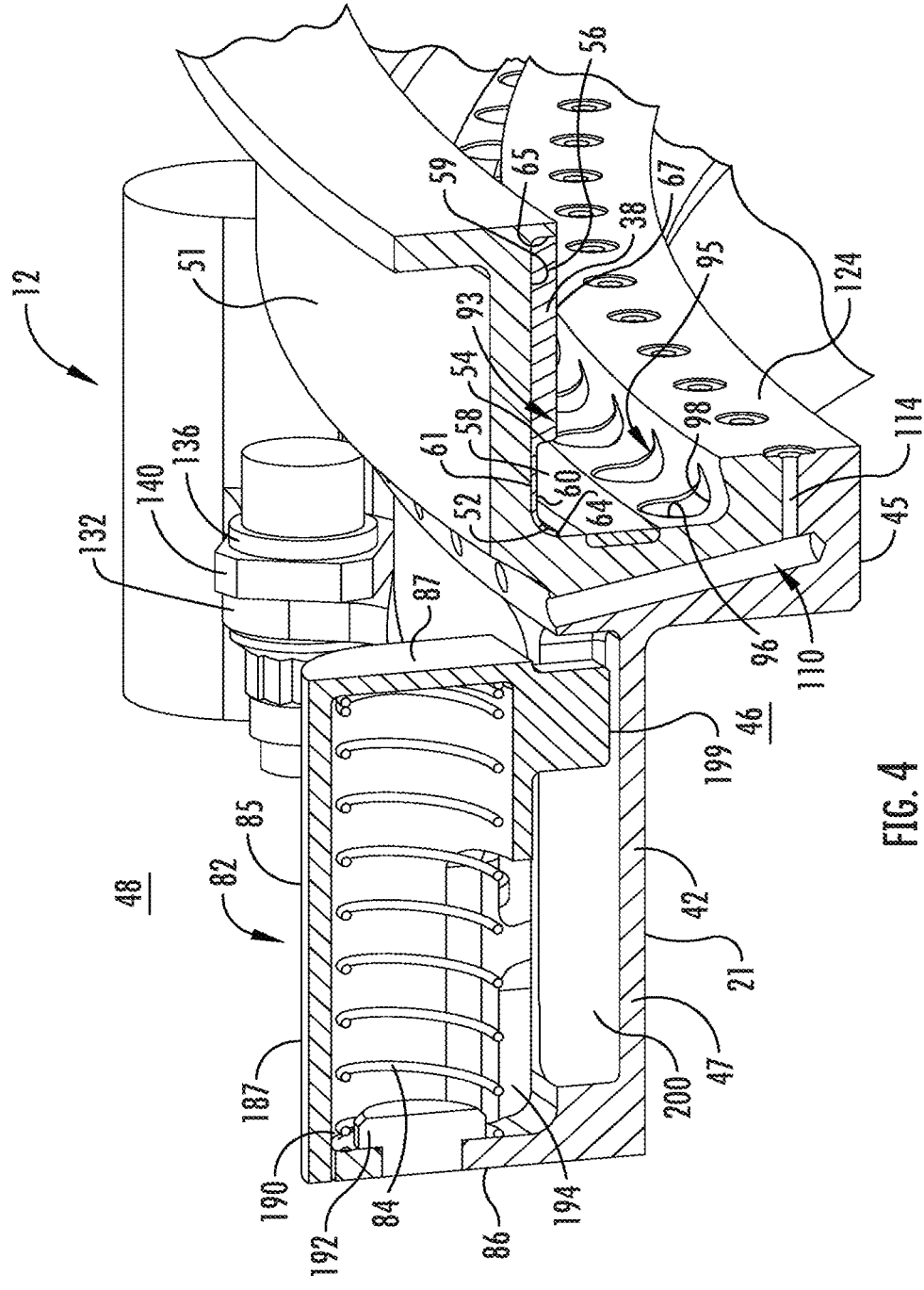
FIG. 4 is a cut-away perspective view of a stator portion of the seal in FIG. 3 according to an embodiment of the present disclosure.

More specifically, as illustrated in FIGS. 2-4, an embodiment of a face seal assembly 12 (for example, an aspirating face seal assembly) includes the aspirating face seal 16 (for example, an annular aspirating face seal) and a secondary seal 20, which is illustrated herein as including a piston ring 20 as illustrated in FIG. 3. The face seal assembly 12 is designed for controlling leakage or sealing between a high pressure region 48 and a low pressure region 46 such as may be found in a turbomachine such as the gas turbine engine 100 as illustrated in FIG. 2. Turbomachines include, but are not limited to, steam turbines, compressors, and turbo compressors such as may be used in the gas and oil industry, or similar apparatus.

The gas turbine engine 100 is circumscribed about a centerline axis 8 and includes an annular stationary stator or non-rotatable member 102 coupled to an annular frame 103 and a rotating or rotatable member 104 coupled to a rotor 105, at least in part, rotatably supported by an aft bearing 108. The annular frame 103 is an annular turbine center frame 37 circumscribed about the centerline axis 8 of the gas turbine engine 100. Additionally, the non-rotatable member 102 is a stationary annular member circumscribed about the centerline axis 8 of the gas turbine engine 100. The non-rotatable member 102 is bolted to the annular frame 103 and the rotatable member 104 is rotatably coupled within the gas turbine engine 100 to rotate about the centerline axis 8. The high pressure region 48 is located radially outwardly of the low pressure region 46, and the non-rotatable member 102 is located radially between the high pressure region 48 and the low pressure region 46. The annular frame 103 supports a middle bearing 107 in an annular sump 109 bounded by a generally conical sump member 66 located radially inwardly of the non-rotatable member 102.

A drain hole 142 in the non-rotatable member 102 is located upstream or forward of the aspirating face seal 16 and the secondary seal 20. A drain tube 144 is connected to and in fluid communication with drain hole 142. The drain tube 144 and the drain hole 142 provides a drain assembly 146 to help prevent oil from flowing into the aspirating face seal 16.

The aspirating face seal 16 is used to restrict leakage of a high pressure air flow 120 from the high pressure region 48 to the low pressure region 46 between the non-rotatable member 102 and the rotatable member 104. The high pressure air flow 120 passes through the aspirating face seal 16 between the rotatable and non-rotatable members 104, 102 and between gas bearing rotatable and non-rotatable face surfaces 125, 124 respectively. The rotatable and non-rotatable face surfaces 125, 124 are circumscribed around and generally perpendicular to the centerline axis 8. An air bearing film is formed between the rotatable and non-rotatable face surfaces 125, 124 which function as a slider bearing face and a rotor bearing face, respectively.

Figure 5:
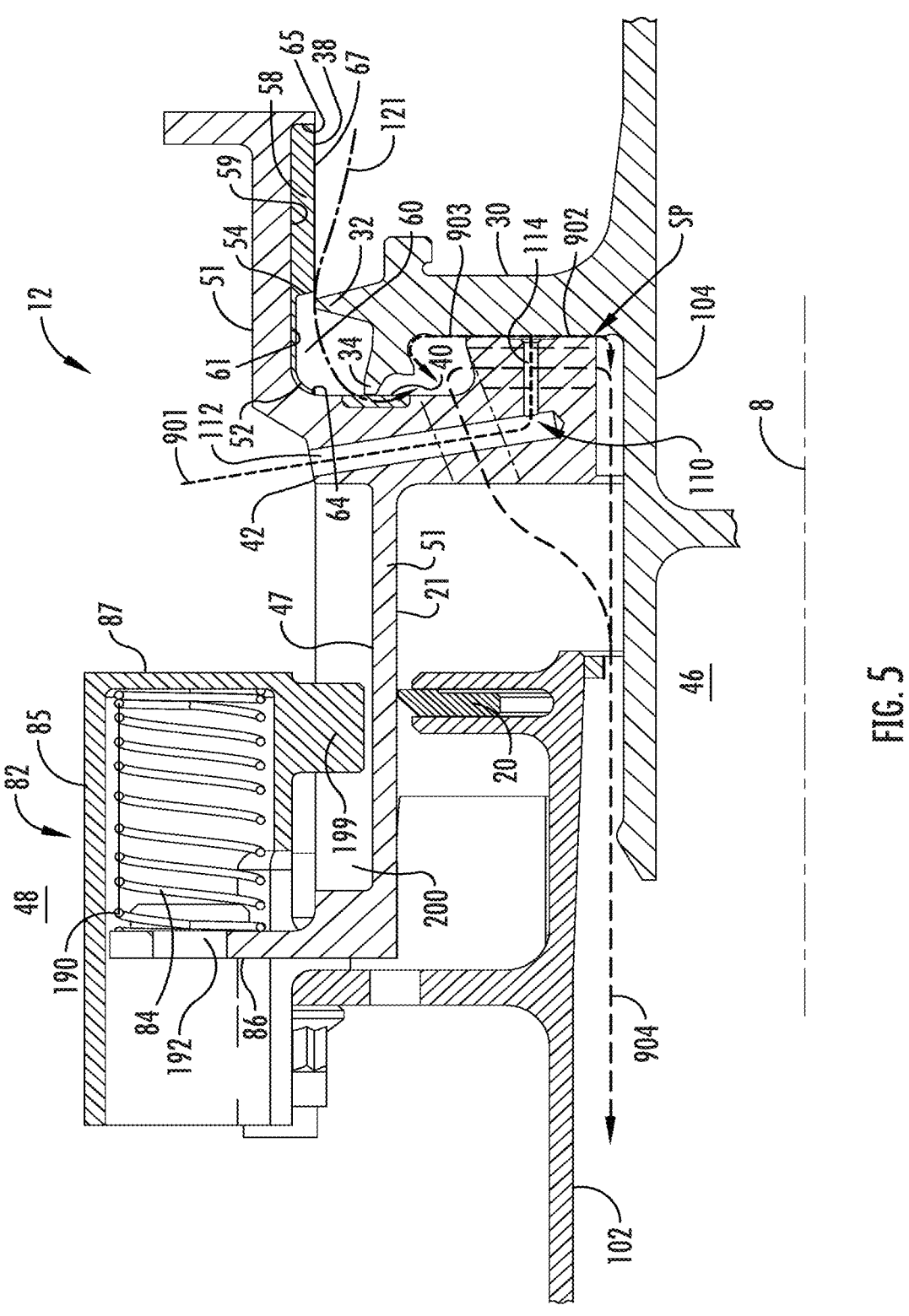
FIG. 5 is a cross-sectional view of the seal in FIG. 3 in a closed position according to an embodiment of the present disclosure.
Figure 6:
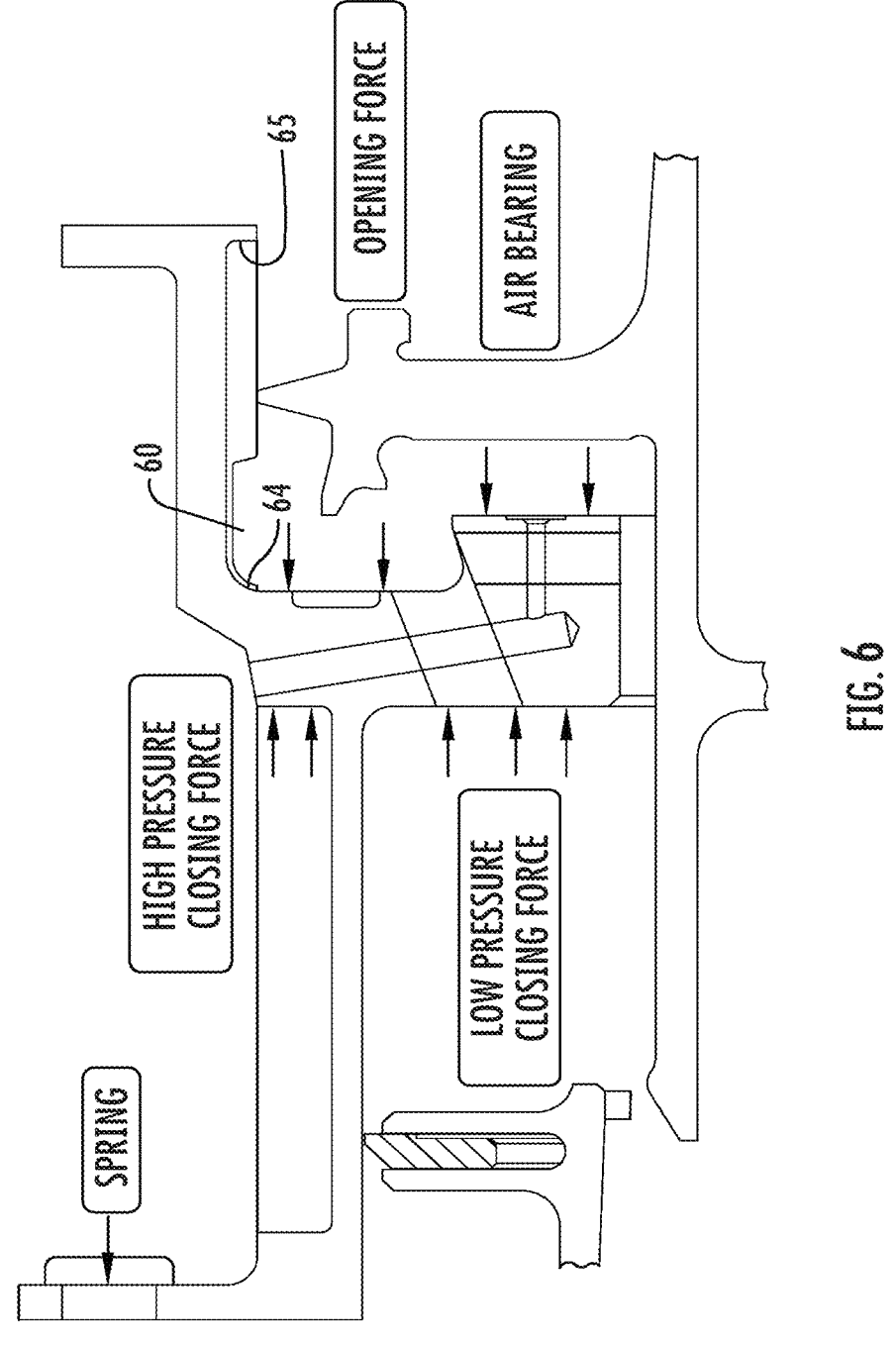
FIG. 6 is a diagram of forces acting on the seal in FIG. 5. according to an embodiments of the present disclosure.

The embodiment of the aspirating face seal 16 illustrated in FIGS. 5 and 6 includes a seal teeth carrier 30 (for example, a rotatable seal teeth carrier) which may be an annular flange on the rotatable member 104. The rotatable face surface 125 is on the seal teeth carrier 30. Primary, starter, and deflector teeth 34, 32, 36 are mounted radially outwardly of the rotatable face surface 125 on the seal teeth carrier 30. The primary and starter teeth 34, 32 are annular labyrinth seal teeth designed and operable to sealingly engage corresponding annular abradable primary and starter seal lands 40, 38 located and mounted on an annular slider 42 (for example, an axially translatable annular slider) axially slidingly mounted on the non-rotatable member 102 illustrated in FIGS. 3 and 4. The annular slider 42 includes a central ring 45 and annular forward and aft extensions 47, 51 extending forwardly and aftwardly, respectively, from the central ring 45.

The primary tooth 34 extends axially forward and slightly radially outwardly from a forward carrier extension 35 of the seal teeth carrier 30. The starter seal land 38 (for example, a nonrotatable abradable starter seal land) faces radially inwardly from and is carried on the annular aft extension 51 of the annular slider 42. The starter seal land 38 disclosed herein includes an abradable coating 56 disposed in an annular inwardly facing groove 58 extending radially outwardly into the annular aft extension 51. The annular inwardly facing groove 58 includes an axial portion 61 of a radially inwardly facing cylindrical groove surface 59 along the annular aft extension 51 of the annular slider 42 of the non-rotatable member 102. The annular inwardly facing groove 58 includes annular forward and aft groove side surfaces 64, 65 extend radially inwardly from the radially inwardly facing cylindrical groove surface 59 and axially bound the abradable coating 56 or the starter seal land 38.

An annular pocket 60 in the abradable coating 56 or the starter seal land 38 reduces or eliminates contact between the starter tooth 32 and the abradable coating 56 or the starter seal land 38 when the aspirating face seal 16 is closed. Reducing or eliminating starter tooth contact prevents undesirable forces from acting on the annular slider 42 and minimizes thermal distortion, which reduces the probability of non-rotatable face surface 124 cracking due to an air bearing rub.

The annular pocket 60 extends radially outwardly from a cylindrical radially outer abradable surface 67 of the starter seal land 38 or the abradable coating 56 to a pocket bottom. The annular pocket 60 includes axially spaced apart annular forward and aft sides 52, 54 extending radially inwardly from the pocket bottom. Thus, the annular pocket 60 is axially bounded by the forward and aft sides 52, 54 and radially inwardly bounded by the pocket bottom. The pocket bottom may be a thin abradable material layer of the starter seal land 38 or the abradable coating 56 surrounding the radially inwardly facing cylindrical groove surface 59 along the non-rotatable member 102, as illustrated in FIG. 3. The embodiment of the annular pocket 60 illustrated in FIGS. 3-6 extends axially aftwardly from the annular forward groove side surface 64 into the starter seal land 38 or the abradable coating 56. The annular pocket 60 extends substantially along the axial portion 61 of the radially inwardly facing cylindrical groove surface 59 along the annular aft extension 51 of the annular slider 42 of the non-rotatable member 102.

The primary seal land 40, in the embodiment of the aspirating face seal 16 illustrated in FIGS. 5 and 6, includes faces axially aftwardly from and is carried on the central ring 45 of the annular slider 42. The starter seal land 38 is located aft of the non-rotatable face surface 124 on the central ring 45. The non-rotatable face surface 124 is mounted on the central ring 45. The deflector tooth 36 extends axially forward and slightly radially inwardly from the forward carrier extension 35 of the seal teeth carrier 30. The forward carrier extension 35 extends forwardly from the seal teeth carrier 30 and supports the primary and the deflector teeth 34, 36. The starter tooth 32 extends substantially radially from the seal teeth carrier 30 and substantially normal to the centerline axis 8 of the gas turbine engine 100. The primary and starter seal lands 40, 38 may be made of or include an abradable material. The abradable material may be a honeycomb material, thermal spray abradable material such as nickel graphite, or other abradable material.

The non-rotatable face surface 124 is located radially inwardly of the primary and starter seal lands 40, 38 on the annular slider 42 and is substantially parallel to the rotatable face surface 125 on the rotatable member 104. The non-rotatable and rotatable face surfaces 124, 125 are axially spaced apart a variable distance 123. Under a pressure differential between the high pressure region 48 and the low pressure region 46, the annular slider 42 moves axially aft, closing the non-rotatable and rotatable face surfaces 124, 125. A plenum 69 (for example, a variable axial length annular plenum) extends axially between the annular slider 42 and the rotatable face surface 125. A gas bearing space extends axially between the nonrotatable and rotatable face surfaces 124, 125.

Referring to FIGS. 4-6, air feed passages 110 extend through the central ring 45 of the annular slider 42 and from the high pressure region 48 to the gas bearing space between the non-rotatable and rotatable face surfaces 124, 125. The embodiment of the air feed passages 110 illustrated herein includes feed holes 112 extending generally radially inwardly from the high pressure region 48 through the central ring 45 to corresponding axially extending orifice bores 114 in the central ring 45. The corresponding axially extending orifice bores 114 extend axially through the central ring 45 from the feed holes 112 through the non-rotatable face surface 124 to the gas bearing space.

First and second pluralities 93, 95 of circumferentially spaced apart first and second vent passages 96, 98 through the central ring 45 of the annular slider 42 provide pressure communication between the plenum 69 and the low pressure region 46 as illustrated in FIG. 5. The first and second vent passages 96, 98 vent the plenum 69 to the low pressure region 46 during engine operation when there is a substantial pressure differential between the high pressure region 48 and the low pressure region 46. The first vent passages 96 are inclined radially inwardly and extend from the plenum 69 forward and radially inwardly. The second vent passages 98 extend substantially radially inwardly from the plenum 69 through the central ring 45 of the annular slider 42.

The starter tooth 32 is used to initiate closure of the aspirating face seal 16. The starter tooth 32 is located on the seal teeth carrier 30 mounted on the rotatable member 104 and extends radially towards the starter seal land 38. This design allows the starter tooth to rub into an abradable during high radial excursions rather than have metal to metal contact. The deflector tooth 36 is used to help reduce build-up of interior pressures in the gas bearing space and the plenum 69 between the stationary and rotating seal surfaces.

Figure 7:
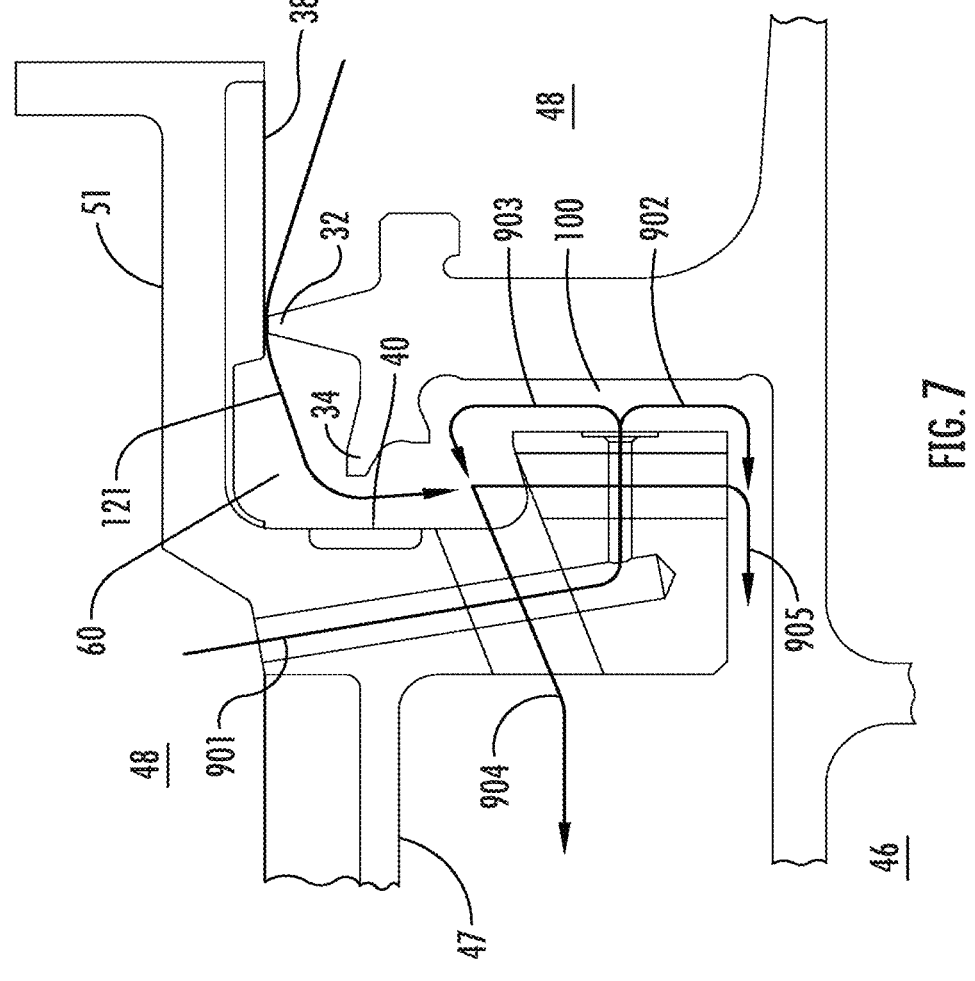
FIG. 7 is a diagram of air flows through the seal in FIG. 5 according to an embodiments of the present disclosure.
Figure 8:
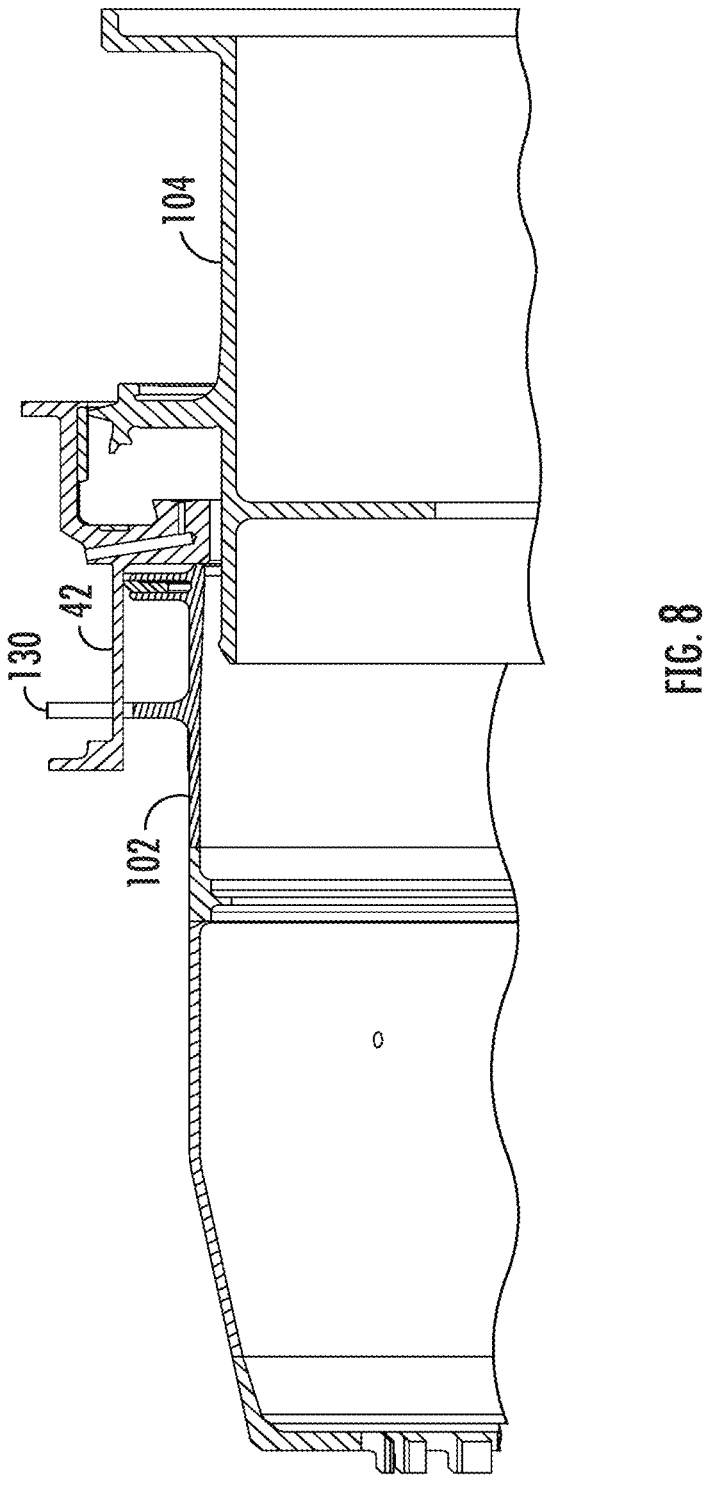
FIG. 8 is a cross-sectional view of a slider and the seal in FIG. 5 according to an embodiments of the present disclosure.

FIG. 7 illustrates various air flows and tooth gaps for the aspirating face seal 16 during engine operation when the aspirating face seal 16 is partially open. Primary tooth and starter tooth gaps between the primary and starter teeth 34, 32 and the primary and starter seal lands 40, 38 respectively allow room to draw flow between the teeth and lands. Bearing flow 901 moves from the high pressure region 48 through the air feed passages 110 into the gas bearing space between the nonrotatable and rotatable face surfaces 124, 125. The bearing flow 901 exits the gas bearing space as the radially outward bearing flow 903 and radially inward bearing flow 902. The radially outward bearing flow 903 passes through the first and second vent passages 96, 98 and together with the radially inward bearing flow 902 passes through a gap between the rotatable member 104 and the non-rotatable member 102 to reach the low pressure region 46. Seal flow 121 leaks or flows between the starter tooth 32 and the starter seal land 38 and then between the primary tooth 34 and the primary seal land 40. During engine operating conditions with the aspirating face seal 16 closed, the primary tooth 34 is the main restriction to air flow through the aspirating face seal 16. The seal flow 121 merges with the radially outward bearing flow 903 in the plenum 69, and the merged flows exit the aspirating face seal 16 as vent flow 904 passing through the first and second vent passages 96, 98 respectively. The merged flows then pass through the gap between the rotatable member 104 and the non-rotatable member 102 to reach the low pressure region 46.

The seal flow 121 across the primary tooth 34 and the radially outward bearing flow 903 enter the plenum 69 as jets, due to a pressure drop across the aspirating face seal 16 from the high pressure region 48 to the low pressure region 46. The seal flow 121 exits the primary tooth gap between the primary tooth 34 and the primary seal land 40 traveling substantially radially inward towards the first and second vent passages 96, 98. The radially outward bearing flow 903 enters the plenum 69 traveling radially outwardly and is redirected by the deflector tooth 36 towards the first and second vent passages 96, 98. The radially outward bearing flow 903 and the seal flow 121 merge into axial and radially inward vent flows 904, 905 which flow out from the plenum 69 through the first and second vent passages 96, 98 respectively to the low pressure region 46.

The redirection of radially outward bearing flow 903 by the deflector tooth 36 increases flow into the first vent passages 96 causing a higher discharge coefficient ($C_d$) and greater effective passage area. This causes the air pressure in the plenum 69 to approach that of the low pressure region 46. Similarity in pressure between the plenum 69 and the low pressure region creates a more stable force balance acting on the annular slider 42, which results in a more determinate operating clearance between air bearing surfaces. $C_d$ is a standard engineering ratio used to find the effective area of a hole or passage that a fluid is passing through, i.e., actual area*$C_d$=effective area. An exemplary embodiment of $C_d$ is equal to 1, but $C_d$ for real holes is lower. During higher power operation, the primary tooth 34 restricts the high pressure air flow 120 flowing from the relatively high pressure region 48 to the low pressure region 46, thereby, causing an increase in the pressure differential between the high pressure region 48 and the low pressure region 46. A high pressure differential between the high pressure region 48 and the low pressure region 46 acts on areas of the annular slider 42 upstream of the starter tooth 32 resulting in a net axial force that pushes the annular slider 42 and the primary and starter seal lands 40, 38 located on the annular slider 42 toward the rotatable face surface 125 on the rotatable member 104 and the primary, starter, and deflector teeth 34, 32, 36. The aspirating face seal 16 is illustrated in an open position in FIG. 3 and in a closed position in FIG. 5.

Illustrated in FIGS. 2-5 is a retracting mechanism 82 for retracting the annular slider 42 and the non-rotatable face surface 124 away from the rotatable member 104 and the rotatable face surface 125 during low or no power conditions. This causes the gas bearing space and the plenum 69 to axially lengthen and the primary seal land 40 on the annular slider 42 to retract from the primary tooth 34.

Referring to FIGS. 3-5 and 8, the embodiment of the retracting mechanism 82 includes one or more coil spring(s) 84 (for example, one or more circumferentially spaced apart coil springs) disposed within a spring chamber 185 of circumferentially spaced apart cartridges 85. Each of the circumferentially spaced apart cartridges 85 includes an annular housing 187 surrounding the spring chamber 185 attached to the non-rotatable member 102. An aft end wall 87 of the annular housing 187 may be attached to the non-rotatable member 102. A forward end 190 of a coil spring 84 rests against a stop finger 86 (for example, an axially forward static stop finger) which extends radially outwardly from and is attached to or part of the annular slider 42. The stop finger 86 may be integrally formed with the annular slider 42 as illustrated herein. A plug 192 disposed in an aperture in the stop finger 86 extends into the chamber and anchors the coil spring 84 as illustrated in FIGS. 4-5.

The stop finger 86 extends radially through an axially extending slot 194 in the annular housing 187 into the spring chamber 185 as illustrated in FIGS. 4-5. This allows the annular slider 42 to translate axially and allows the coil spring 84 to compress and expand, thus, biasing the annular slider 42. A tongue 199 extends radially inwardly from the annular housing 187 into a groove 200 in the annular slider 42. This tongue and groove arrangement helps guide the annular slider 42 during axial translation relative to the annular housing 187 of the circumferentially spaced apart cartridges 85. The annular slider 42 is thus capable of axial translation and limited gimballing motion in response to an axial force and tilt moments respectively.

Referring to FIGS. 3-5, the circumferentially spaced apart cartridges 85 is connected or attached to the non-rotatable member 102. The embodiment of the seal illustrated herein includes an annular flange 130 around and fixed to the non-rotatable member 102. The circumferentially spaced apart cartridges 85 are attached to the annular flange 130. The circumferentially spaced apart cartridges 85 may be attached to the annular flange 130 using pairs of lugs 132 extending radially outwardly from the annular flange 130. The circumferentially spaced apart cartridges 85 may be bolted to the lugs 132 with bolts 136 disposed through ear bolt holes through ears 140 attached to the circumferentially spaced apart cartridges 85 and through lug bolt holes disposed through the lugs 132. Thus, the circumferentially spaced apart cartridges 85 may be removably mounted to the non-rotatable member 102. The annular flange 130 is illustrated herein as being continuous but may be segmented.

The retracting mechanism 82 and the coil spring(s) 84 are upstream, with respect to the bearing airflow in the gas bearing space, of the annular slider 42 and the aspirating face seal 16 in the high pressure region 48. The retracting mechanism 82 and the coil spring(s) 84 are positioned upstream from the secondary seal 20 with respect to bearing airflow through the aspirating face seal 16. The retracting mechanism 82, including the coil spring(s) 84 are positioned radially outwardly of the forward extension 47, and the secondary seal 20 is positioned radially inwardly of the forward extension 47. The secondary seal 20 is in sealing engagement with an annular radially inner slider surface 21 of the annular slider 42 and is located on a border between the high pressure region 48 and the low pressure region 46. The retracting mechanism 82 and the coil spring(s) 84 are located radially outwardly of the annular slider 42 and the secondary seal 20 is located radially inwardly of the annular slider 42. The arrangement of the retracting mechanism 82 and the secondary seal 20 reduces deflection of the non-rotatable face surface 124 on the annular slider 42.

The central ring 45 of the annular slider 42 is designed to translate between axial retracted and sealing positions RP, SP as illustrated in FIGS. 3 and 5, respectively, as a result of forces, illustrated in FIG. 6, acting on the central ring 45. The forces are the result of pressures in the high pressure region 48 and the low pressure region 46 acting on surfaces and spring forces of the retracting mechanism 82.

Referring to FIG. 3, as the engine is started, the pressure in the high pressure region 48 begins to rise because the starter tooth 32 restricts the high pressure air flow 120 flowing from the high pressure region 48 to the low pressure region 46. The pressure differential between the high pressure region 48 and the low pressure region 46 results in a closing pressure force acting on the central ring 45. The pressure force acts against a spring force from the retracting mechanism 82 to push the central ring 45 and non-rotatable face surface 124 mounted thereupon towards the rotatable face surface 125 (for example, a gas bearing rotatable face surface). FIG. 6 illustrates high and low pressure closing forces acting on the aspirating face seal 16 during engine start-up and how the closing forces overcomes the spring force and friction force at the tongue and groove and the piston ring interface. Referring to FIG. 5, during shutdown of the engine, pressure in the high pressure region 48 drops off and the coil spring(s) 84 of the retracting mechanism 82 overcome the closing force and retract the aspirating face seal 16. Opening forces from high pressure air in the air bearing between the rotatable and non-rotatable face surfaces 125, 124 are also illustrated in FIG. 6.

Figure 9:
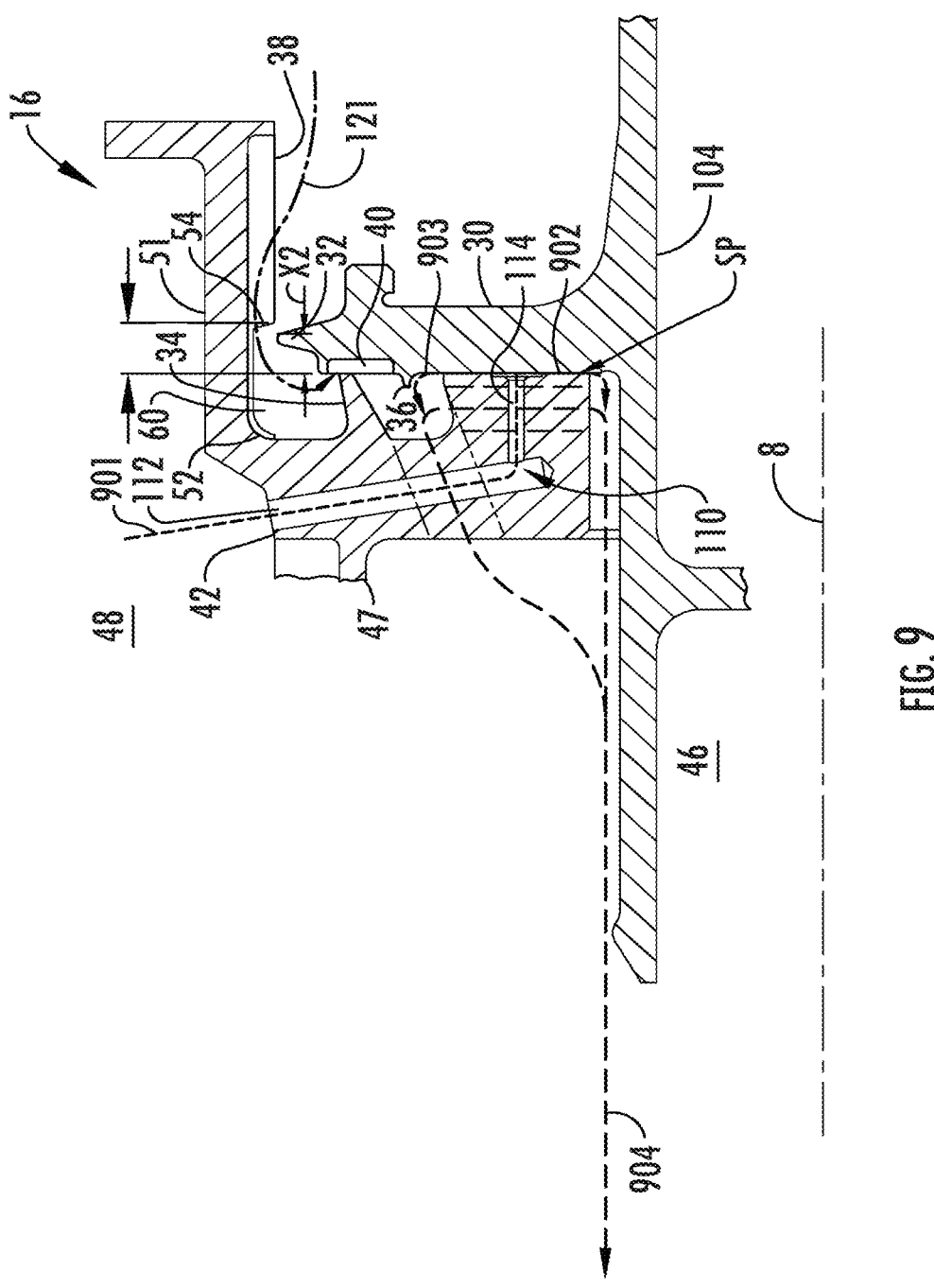
FIG. 9 is a cross-sectional view of a seal of the portion of the gas turbine engine in FIG. 2 in a closed engine on position according to an embodiments of the present disclosure.

Referring to FIG. 9, another embodiment of the aspirating face seal 16, is illustrated according to the present disclosure. The aspirating face seal 16 includes a seal teeth carrier 30) in the form of a flange on the rotatable member 104. The rotatable face surface 125 is on the seal teeth carrier 30. The primary tooth 34 is mounted on an annular slider 42 instead of the seal teeth carrier 30 on the rotatable member 104 as the embodiment illustrated in FIGS. 1-4. The starter and deflector teeth 32, 36 are mounted radially outwardly of the rotatable face surface 125 on the seal teeth carrier 30.

The primary and starter teeth 34, 32 are annular labyrinth seal teeth designed and operable to engage corresponding abradable primary and starter seal lands 40, 38. The primary seal land 40 faces axially forwardly from and is mounted on the seal teeth carrier 30. The primary seal land 40 located radially outwardly of the rotatable face surface 125 and the deflector tooth 36. The primary tooth 34 extends axially aftwardly from the annular slider 42 radially between the annular aft extension 51 and the central ring 45 of the annular slider 42. The deflector tooth 36 extends axially aftwardly from the seal teeth carrier 30. The starter tooth 32 extends substantially radially from the seal teeth carrier 30 and substantially normal to the centerline axis 8 of the gas turbine engine 100.

Referring now to FIGS. 10A-14, illustrated are various views of an embodiment of a seal assembly for a rotary machine having a wear protection assembly according to the present disclosure, in particular, a seal assembly 202 with an abradable covering 302 for a gas turbine engine 100, for example. More specifically, FIGS. 10A-14 illustrate various embodiments of a wear protection assembly according to the present disclosure, in particular, a wear protection assembly 300 for the seal assembly 202.

As generally shown in FIGS. 10A-12B and 14, the wear protection assembly 300 includes, at least, the abradable covering 302 positioned over an opening 304 of a high-pressure aspiration conduit as described herein (for example, a slider high-pressure aspiration conduit 238) or an opening of a flow modifying surface feature (for example, a hole 307 in a rotor surface) of a seal rotor 222 and a seal slider 226 of the gas turbine engine 100. Thus, during operation of the rotary machine 1000 of FIG. 1 having a gas turbine engine 100 of FIG. 2, for example, and upon the seal rotor 222 and the seal slider 226 making contact with each other at the rotor-stator interface 201 (such that a seal cavity 328 of the seal assembly 202 is at least partially closed, for example), a portion of the seal rotor 222 or the seal slider 226 is allowed to abrade the abradable covering 302 to expose the opening 304 and at least partially reopen the seal cavity 328. As such, reopening the seal cavity 328 allows airflow into the seal cavity 328 from the opening 304 of the slider high-pressure aspiration conduit 238. Thus, in certain embodiments, the abradable covering 302 may have a thickness variation (e.g., 0.035±0.005, 0.045±0.010 inches) lower than a minimum wall thickness of the seal slider 226 (e.g., a minimum wall thickness of an air bearing wall 305 of the seal slider 226) or the seal rotor 222 (e.g., 0.05±0.006 inches). In other embodiments, the abradable covering 302 may have a thickness variation that ranges between about 0.035 to about 0.055±0.010 inches and may have a minimum wall thickness of the air bearing wall 305 of the seal slider 226 that ranges between about 0.044 to about 0.056±0.010 inches. As used herein, the seal cavity 328 and the gas bearing space refer to the same region of a seal or seal assembly.

Figures 10A, 10B:
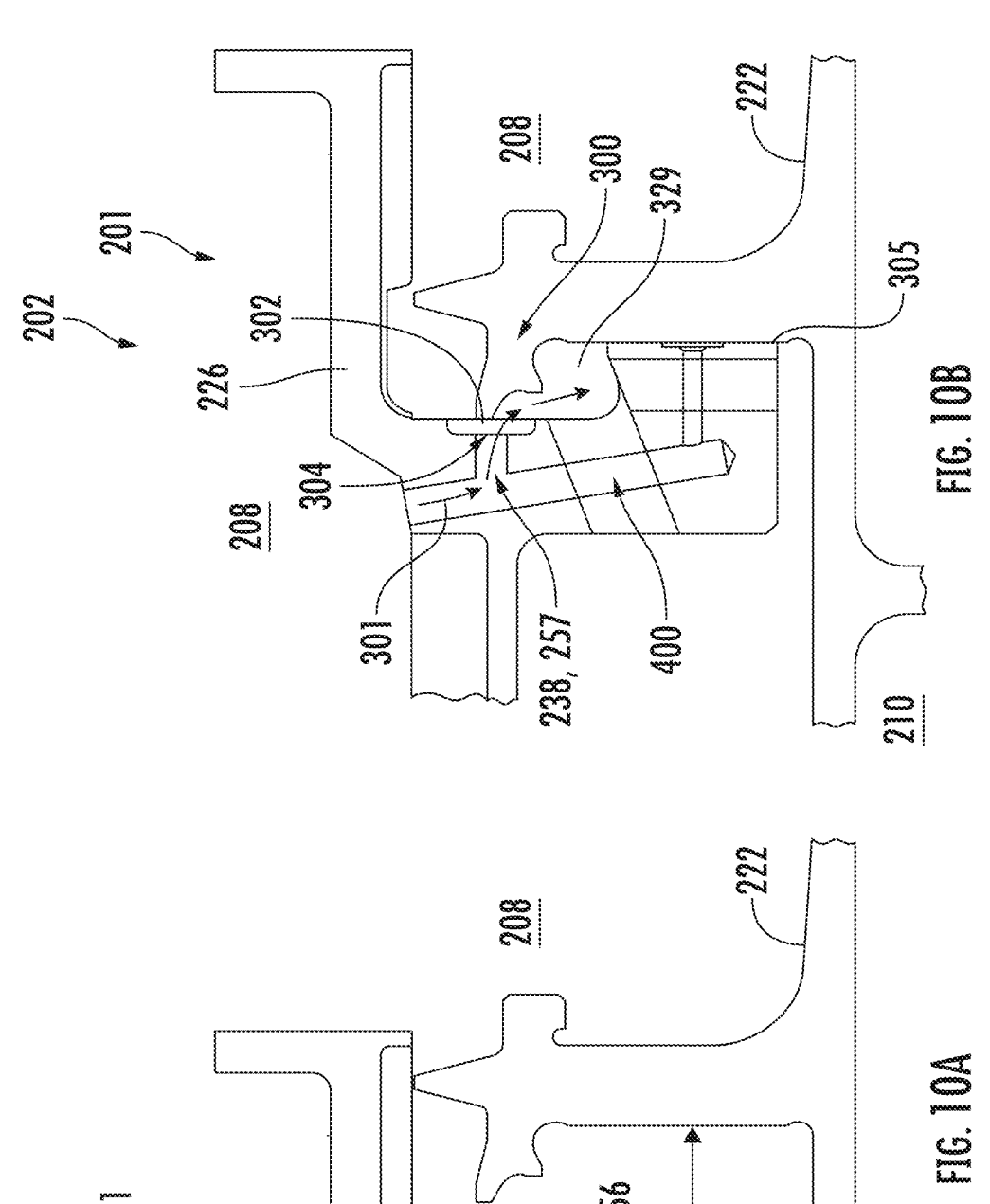
FIG. 10A is a schematic view of a seal assembly of the gas turbine engine in FIG. 2 in an open engine on position according to an embodiment of the present disclosure, particularly illustrating a clearance at the rotor-stator interface being open.
FIG. 10B is a schematic view of another seal assembly of the gas turbine engine of FIG. 2 in a closed engine on position according to an embodiment of the present disclosure, particularly illustrating a clearance at the rotor-stator interface being closed such that contact occurs between a seal rotor and seal slider during operation.

Referring particularly to FIG. 10A, the seal assembly 202 is illustrated in an open position. As used herein, the open position generally refers to the seal cavity 328 of the seal assembly 202 having a clearance 256 between the seal rotor 222 and the seal slider 226 such that no contact is occurring therebetween. During operation of the seal assembly 202, for example, the clearance 256 may range from a minimum operating clearance to a maximum possible structural clearance depending on the size and proportions of the seal assembly 202 and the operating parameters.

In contrast, as shown in FIG. 10B, the seal assembly 202 is illustrated in a closed position. Under extreme vibratory, thermal, or transient conditions like stall, for example, the air bearing surface in a closed position may contact. As used herein, the closed position generally refers to the position in which the seal rotor 222 and the seal slider 226 are in contact and the clearance 256 is closed. Thus, in the closed position, wear can occur between the seal rotor 222 and the seal slider 226. Accordingly, the wear protection assembly 300 described herein is configured to reopen the seal assembly 202 after a certain wear depth is generated through the abradable covering 302 to expose the opening 304. Accordingly, as shown in FIG. 10B, upon the clearance 256 closing, high pressure air 301 is diverted into a trench cavity 329 (which is a small portion of the seal cavity 328, defined by the at least partially closed seal cavity 328 and a slider face 232) so as to open up the seal assembly 202 to prevent further wear.

Referring still to the illustrated embodiment of FIGS. 10A and 10B, the abradable covering 302 of the wear protection assembly 300 may be positioned on the slider face 232 of the seal slider 226 over an opening 304 of a slider high-pressure aspiration conduit 238. In such embodiments, the slider high-pressure aspiration conduit 238 is defined by and extends at least partially through a thickness of the seal slider 226. Thus, as shown, the opening 304 may be at an outlet of a secondary airflow channel 257 of the slider high-pressure aspiration conduit 238, with the secondary airflow channel 257 being in fluid communication with a primary airflow channel 400 of the slider high-pressure aspiration conduit 238. In other embodiments, the slider high-pressure aspiration conduit 238 described herein may defined by or extend through any of the component(s) of the seal assembly 202.

The relatively high-pressure fluid of an inlet plenum 208 is in fluid communication with the seal cavity 328 and the abradable covering 302 closes the outlet of the secondary airflow channel 257 of the slider high-pressure aspiration conduit 238, i.e., the opening 304. Thus, in such embodiments, during normal operation, the slider high-pressure aspiration conduit 238 is configured to divert flow from a high-pressure region of the inlet plenum 208 through a primary airflow channel 400 and into the seal cavity 328. However, upon the seal rotor 222 and the seal slider 226 making contact at the rotor-stator interface 201, the abradable covering 302 is configured to abrade and expose the opening 304. As described in detail herein, the portion of the seal rotor 222 is any of the teeth of the seal rotor 222. Therefore, the seal cavity 328 is exposed to the airflow from the inlet plenum 208 via the slider high-pressure aspiration conduit 238. In this way, the seal assembly 202 is configured to open and avoid further wear, as the relatively high-pressure fluid of the inlet plenum 208 discharges into the trench cavity 329 and exits to the outlet plenum 210.

Figures 11A, 11B:
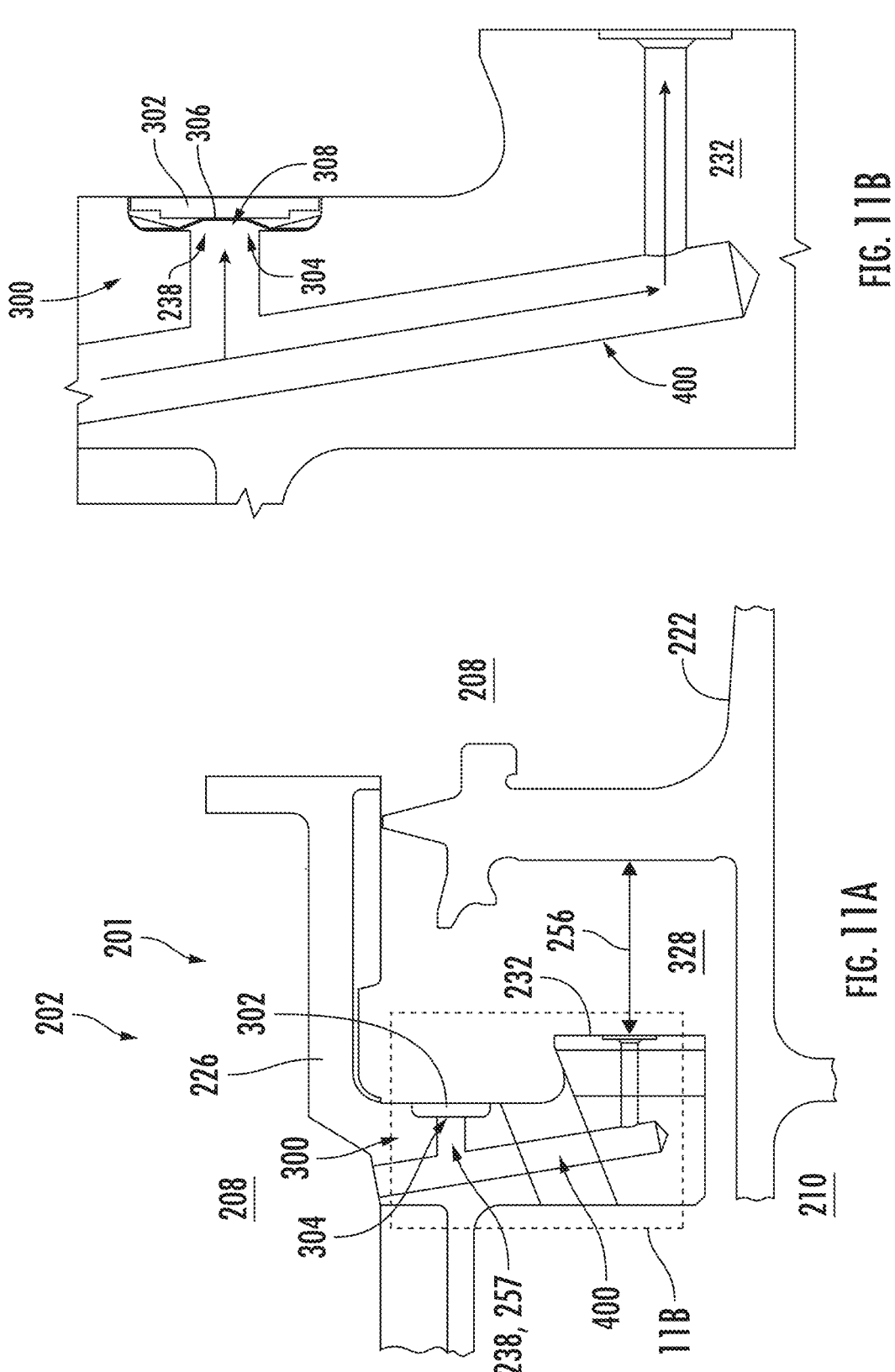
FIG. 11A is a detailed, schematic view of a portion of a seal assembly according to an embodiment of the present disclosure.
FIG. 11B is a detailed view of the portion of the seal assembly illustrated in FIG. 11A, particularly illustrating features of a wear protection assembly according to an embodiment of the present disclosure.

Referring now to FIGS. 11A and 11B, various details of an embodiment of the wear protection assembly 300 according to the present disclosure are illustrated. In particular, FIG. 11A illustrates a detailed, schematic view of a portion of an embodiment of a seal assembly 202 according to the present disclosure, whereas FIG. 11B illustrates a detailed view of the portion of the seal assembly illustrated in FIG. 11A, particularly illustrating features of the wear protection assembly 300 according to the present disclosure. In the illustrated embodiment, as shown, the abradable covering 302 is positioned on the slider face 232. Furthermore, as shown, the wear protection assembly 300 also includes an opening cover 306 arranged between the opening 304 of the slider high-pressure aspiration conduit 238 and the abradable covering 302. Thus, as further shown, an air pocket 308 is formed in the slider face 232 parent material between the opening cover 306 and the opening 304 of the slider high-pressure aspiration conduit 238.

In such embodiments, the opening cover 306 is configured to protect the seal rotor 222 from damage to, or damage from, impact with the seal slider 226 or vice versa. In another embodiment, the air pocket 308 and the opening cover 306 facilitate the opening 304 being clear and unobstructed upon the seal rotor 222 and the seal slider 226 making contact and abrading through the abradable covering 302 and the opening cover 306. In another embodiment the opening cover 306 and the air pocket 308 that it covers are completely covered by the abradable covering 302

The abradable covering 302 and the opening cover 306 may be constructed of any suitable abradable material that can be abraded or worn as described herein, such as NiGR (Nickel graphite 85/15, 75-25), felt metal, Hastex Honeycomb (conventional or additively printed), METCO-601 (aluminum polyester powder), and polytetrafluoroethylene. For example, in an embodiment, the abradable covering 302 and the opening cover 306 may be constructed of one or more abradable materials or composites. Moreover, the abradable covering 302 and the opening cover 306 may have successive layers of abradable material(s). Further, the abradable covering 302 and the opening cover 306 also may include an erosion or corrosion resistant coating or layer to prevent premature wear of the abradable covering 302 and the opening cover 306.

Figures 12A, 12B:
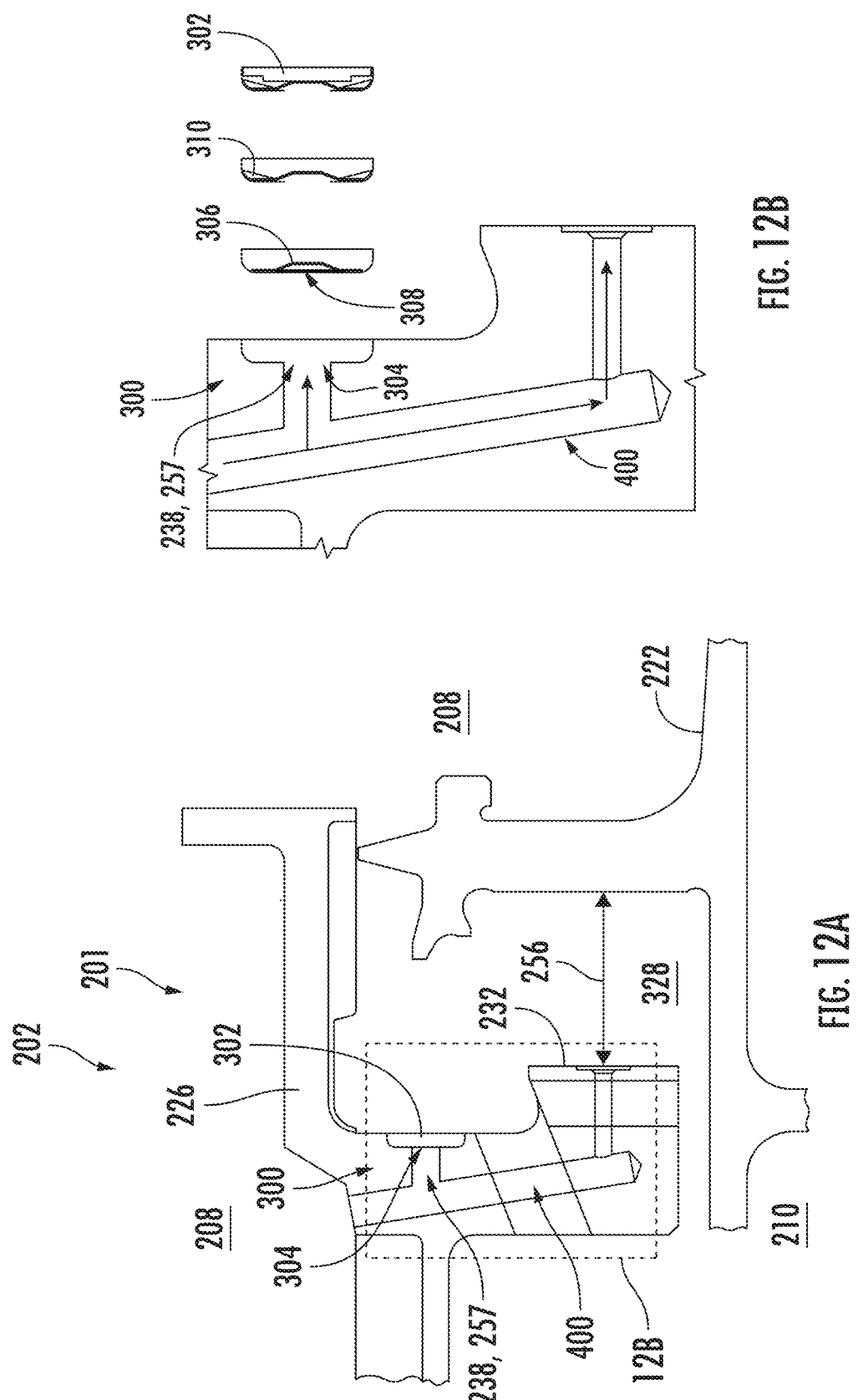
FIG. 12A shows a detailed, schematic view of a portion of another seal assembly according to an embodiment of the present disclosure.
FIG. 12B is a detailed view of the portion of the seal assembly illustrated in FIG. 12A, particularly, an exploded view of the features of a wear protection assembly of the seal assembly according to an embodiment of the present disclosure.

Referring now to FIGS. 12A and 12B, another embodiment of the wear protection assembly 300 for the seal assembly 202 is illustrated according to the present disclosure. In particular, as shown in the illustrated embodiment, the abradable covering 302 and the opening cover 306 are positioned on the slider face 232. The opening cover 306 is arranged between the opening 304 of the slider high-pressure aspiration conduit 238 and the abradable covering 302.

Figures 13A, 13B, 13C, 13D:
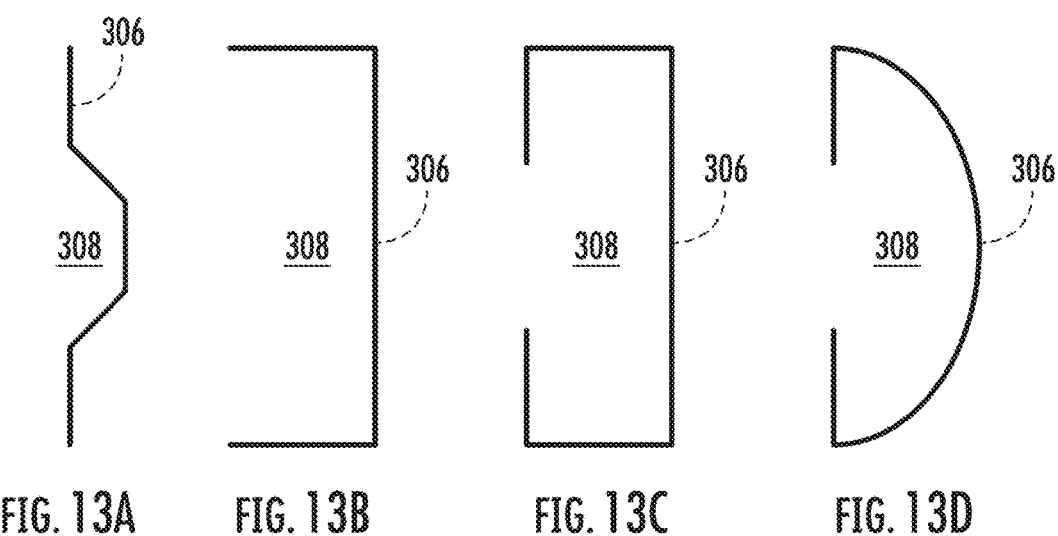
FIG. 13A shows a schematic view of an opening cover of a wear protection assembly defining an air pocket according to an embodiment of the present disclosure.
FIG. 13B shows a schematic view of another opening cover of a wear protection assembly defining an air pocket according to an embodiment of the present disclosure.
FIG. 13C shows a schematic view of another opening cover of a wear protection assembly defining an air pocket according to an embodiment of the present disclosure.
FIG. 13D shows a schematic view of another opening cover of a wear protection assembly defining an air pocket according to an embodiment of the present disclosure.

As shown particularly in FIG. 13A-13D, the opening cover 306 of the wear protection assembly 300 may have any suitable shape to define the air pocket 308 described herein. For example, FIG. 13A illustrates the opening cover 306 having a generally trapezoidal shape with opposing flanges; FIGS. 13B and 13C illustrate illustrates the opening cover 306 having a generally rectangular shape, each having a different size opening, and FIG. 13D illustrates the opening cover 306 having a generally arcuate shape with inwardly-extending flanges. In further embodiments, it should be understood that the opening cover 306 may further have any suitable shape as needed to operate as described herein.

Furthermore, as shown particularly in FIG. 12B, the opening cover 306 may be secured to the seal slider 226 using any suitable means, such as via welding, brazing, additive manufacturing, or similar. In particular embodiments, the opening cover 306 is secured to the seal slider 226 via welding to create a weld structure 310. In further embodiments, the weld structure 310 can be constructed of any suitable material that can be welded and that does not damage and/or deform the seal assembly 202. In another embodiment, the weld structure 310 protects the seal rotor 222 or the seal slider 226 from damage to, or damage from, impact with the seal rotor 222 or the seal slider 226 surrounding the opening 304. In another embodiment, the weld structure 310 is configured to reinforce and/or strengthen the seal rotor 222 or the seal slider 226 surrounding the opening 304.

Figure 14:
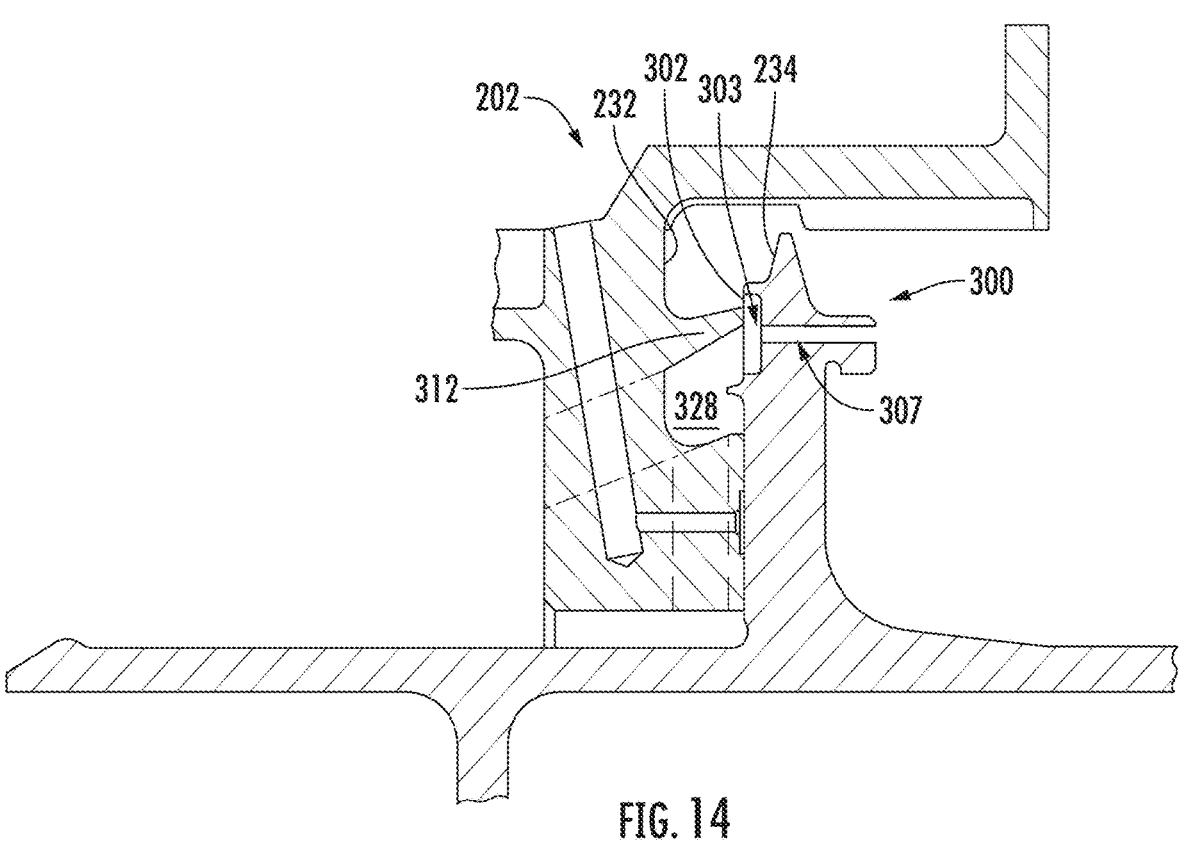
FIG. 14 shows a detailed, schematic view of a portion of a seal assembly according to an embodiment of the present disclosure, particularly an abrading structure.

Referring now to FIG. 14, a detailed, schematic view of a portion of an embodiment of the seal rotor 222 of the seal assembly 202 according to the present disclosure is illustrated. As shown, the seal assembly 202 further includes an abrading structure 312. Furthermore, as shown, the abradable covering 302 is positioned over the opening 303 of at least one hole 307. Moreover, as shown, the hole(s) 307 extends through the seal rotor 222, or at least partially to a structure that allows for fluid communication, so as to connect to upstream high pressure plenum and so as to have supply of high pressure air. Further, as shown, the abrading structure 312 is positioned on the slider face 232. In certain embodiments, the abrading structure 312 may be integral with the slider face 232. In alternative embodiments, the abrading structure 312 may be a separate part secured to the slider face 232. Moreover, the abrading structure 312 may have any suitable shape defining a protrusion that extends from the slider face 232 and into the seal cavity 328. Accordingly, the abrading structure 312 facilitates abrading the abradable covering 302 and/or the opening cover 306 positioned over the opening 303 of the hole(s) 307 extending partially through a thickness of the rotor face 234 of the seal rotor 222.

Accordingly, FIG. 15 illustrates a flow diagram of an embodiment of a method 500 of reducing wear of a seal assembly 202 of a rotary machine according to the present disclosure. It should be appreciated that the method 500 may be implemented with any suitable seal assembly having any suitable configuration. In several embodiments, for example, the seal assembly 202 may be configured as an aspirating face seal, a fluid bearing, a gas bearing, or the like. In addition, or in the alternative, the primary seal may be configured as a radial film riding seal, an axial film riding seal, a radial carbon seal, an axial carbon seal, or the like. In addition, although FIG. 15 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (502), the method 500 includes securing a wear protection assembly comprising, at least, an abradable covering, over an opening of a high-pressure aspiration conduit of a seal slider of a seal stator at a non-contacting seal interface of a seal assembly. In particular, the seal rotor defines a rotor face and the seal slider defines a slider face and an air bearing wall, and the seal rotor and the seal slider define a seal cavity. Further, as shown at (504), during operation of the rotary machine, and upon the seal rotor and the seal stator of the rotary machine making contact with each other at the rotor-stator interface such that the seal cavity of the seal assembly is at least partially closed, the method 500 includes allowing a portion of the seal rotor to abrade the abradable covering to expose the opening, thereby allowing airflow to pressurize a trench cavity defined by the at least partially closed seal cavity and the slider face of the seal slider, and at least partially reopen the seal cavity. Thus, in such embodiment, the method 500 allows airflow into the seal cavity from the opening of the high-pressure aspiration conduit.

It will be appreciated that although the embodiments above discuss an opening of a high-pressure aspiration conduit covered with an abradable material in the context of a wear protection assembly of a seal assembly, in other exemplary embodiments, an opening of a high-pressure aspiration conduit covered with an abradable material may be utilized elsewhere within a rotary machine. For example, in other embodiments, the high-pressure aspiration conduit may be within a member coupled to or formed integrally with a stator or a rotor of a rotor machine and including a wear surface. The member may include an abradable covering positioned over the opening of the high-pressure aspiration conduit (e.g., at the wear surface), with the abradable covering configured to wear during an operation of the stator and rotor to allow a high-pressure airflow through the opening once the abradable covering has worn down (e.g., through interaction between the rotor and stator). The wear surface may be any surface configured to rub or make contact during at least certain operations of the rotary machine where the rotor is rotating relative to the stator.

Further aspects are provided by the subject matter of the following clauses:

A rotary machine, comprising: a stator; a rotor configured to rotate with respect to the stator, the rotor being arranged with the stator at a rotor-stator interface; and a seal assembly at the rotor-stator interface, the seal assembly comprising: a seal cavity defined by a seal rotor and a seal slider of a seal stator, the seal rotor defining a rotor face, the seal slider defining a slider face and an air bearing wall, wherein the seal slider comprises a high-pressure aspiration conduit; at least one non-contacting seal interface; and a wear protection assembly comprising, at least, an abradable covering positioned over an opening of the high-pressure aspiration conduit; wherein, during operation of the rotary machine, and upon the seal rotor and the seal stator of the rotary machine making contact with each other at the rotor-stator interface such that the seal cavity of the seal assembly is at least partially closed, allowing a portion of the seal rotor to abrade the abradable covering to expose the opening, thereby allowing airflow to pressurize a trench cavity defined by the at least partially closed seal cavity and the slider face of the seal slider, wherein the pressurized trench cavity is configured to at least partially reopen the seal cavity.

The rotary machine of the preceding clause, wherein the seal assembly is configured as at least one of an aspirating face seal, a fluid bearing, a gas bearing, or a film riding seal.

The rotary machine of any of the preceding clauses, wherein the opening of the high-pressure aspiration conduit is defined by the slider face of the seal slider, and wherein the high-pressure aspiration conduit is integral with the seal slider.

The rotary machine of the preceding clause, wherein the wear protection assembly further comprises an opening cover arranged between the opening of the high-pressure aspiration conduit and the abradable covering.

The rotary machine of the preceding clause, wherein an air pocket is formed between the opening cover and the opening of the high-pressure aspiration conduit.

The rotary machine of the preceding clauses, wherein the wear protection assembly further comprises a weld structure securing the opening cover on the slider face over the opening.

The rotary machine of any of the preceding clauses, wherein the opening is at an outlet of a secondary airflow channel of the high-pressure aspiration conduit, the secondary airflow channel being in fluid communication with a primary airflow channel of the high-pressure aspiration conduit.

The rotary machine of any of the preceding clauses, wherein the portion of the seal rotor is a primary tooth of the seal rotor.

The rotary machine of any of the preceding clauses, wherein the abradable covering has a thickness less than a thickness of the air bearing wall of the seal slider.

A rotary machine, comprising: a stator; a rotor configured to rotate with respect to the stator, the rotor being arranged with the stator at a rotor-stator interface; and a seal assembly at the rotor-stator interface, the seal assembly comprising: a seal cavity defined by a seal rotor and a seal slider of a seal stator, the seal rotor defining a rotor face, the seal slider defining a slider face and an air bearing wall, wherein the seal slider comprises a high-pressure aspiration conduit; at least one non-contacting seal interface; and a wear protection assembly comprising an abradable covering positioned over an opening of at least one hole extending partially through a thickness of the rotor face such that a seal-side of the at least one hole is covered during non-contacting conditions, wherein, during operation of the rotary machine, and upon the seal rotor and the seal stator making contact with each other at the rotor-stator interface such that the seal cavity is at least partially closed, allowing a portion of the seal slider to abrade the abradable covering to expose the opening, thereby allowing airflow to enter the at least one hole to pressurize a trench cavity defined by the at least partially closed seal cavity and the slider face of the seal cavity, wherein the pressurized trench cavity is configured to at least partially reopen the seal cavity.

The rotary machine of the preceding clause, wherein the seal assembly is configured as at least one of an aspirating face seal, a fluid bearing, a gas bearing, or a film riding seal.

The rotary machine of the preceding clause, wherein the wear protection assembly further comprises an abrading structure on the slider face of the seal slider and extending into the seal cavity, and wherein the trench cavity is defined by the at least partially closed seal cavity, the slider face of the seal cavity, and the abrading structure.

The rotary machine of the preceding clause, wherein the abrading structure is integral with the seal slider.

The rotary machine of the preceding clause, wherein the abrading structure of the seal slider is a primary tooth of the seal slider.

The rotary machine of any of the preceding clauses, wherein the wear protection assembly further comprises an opening cover arranged between the opening of the at least one hole and the abradable covering.

The rotary machine of the preceding clause, wherein an air pocket is formed between the opening cover and the opening of the at least one hole.

The rotary machine of the preceding clauses, wherein the wear protection assembly further comprises a weld structure securing the opening cover on the slider face over the opening.

The rotary machine of any of the preceding clauses, wherein the abradable covering has a thickness less than a thickness of the air bearing wall of the seal slider.

A method of reducing wear in a non-contacting seal interface of a seal assembly of a rotary machine, the method comprising: securing a wear protection assembly over an opening of a high-pressure aspiration conduit of a seal slider of a seal stator at the non-contacting seal interface, the seal rotor defining a rotor face and the seal slider defining a slider face and an air bearing wall, the seal rotor and the seal slider defining a seal cavity, the wear protection assembly comprising an abradable covering; and during operation of the rotary machine, and upon the seal rotor and the seal stator of the rotary machine making contact with each other at a rotor-stator interface such that the seal cavity of the seal assembly is at least partially closed, allowing a portion of the seal rotor to abrade the abradable covering to expose the opening, thereby allowing airflow to pressurize a trench cavity defined by the at least partially closed seal cavity and the slider face of the seal slider, wherein the pressurized trench cavity is configured to at least partially reopen the seal cavity.

The method of the preceding clause, wherein the abradable covering has a thickness less than a thickness of the air bearing wall of the seal slider.

A rotary machine, comprising: a stator; a rotor configured to rotate with respect to the stator; and a member coupled to or formed integrally with the stator or the rotor, the member defining a high-pressure aspiration conduit and comprising a wear surface, the member including an abradable covering positioned over an opening of the high-pressure aspiration conduit, the abradable covering configured to wear during an operation of the stator and rotor to allow a high pressure airflow through the opening.

The rotary machine of any of the preceding clauses, wherein the abradable covering comprises successive layers of abradable material.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A rotary machine, comprising:
a stator;
a rotor configured to rotate with respect to the stator, the rotor being arranged with the stator at a rotor-stator interface; and
a seal assembly at the rotor-stator interface, the seal assembly comprising:
a seal cavity defined by a seal rotor and a seal slider of a seal stator, the seal rotor defining a rotor face, the seal slider defining a slider face and an air bearing wall, wherein the seal slider comprises a high-pressure aspiration conduit;
at least one non-contacting seal interface; and
a wear protection assembly comprising an abradable covering positioned over an opening of the high-pressure aspiration conduit;
wherein, during operation of the rotary machine, and upon the seal rotor and the seal stator of the rotary machine making contact with each other at the rotor-stator interface such that the seal cavity of the seal assembly is at least partially closed, allowing a portion of the seal rotor to abrade the abradable covering to expose the opening, thereby allowing airflow to pressurize a trench cavity defined by the at least partially closed seal cavity and the slider face of the seal slider, wherein the pressurized trench cavity is configured to at least partially reopen the seal cavity,
wherein the opening of the high-pressure aspiration conduit is defined by the slider face of the seal slider, and wherein the high-pressure aspiration conduit is integral with the seal slider,
wherein the wear protection assembly further comprises an opening cover arranged between the opening of the high-pressure aspiration conduit and the abradable covering.

2. The rotary machine of claim 1, wherein the seal assembly is configured as at least one of an aspirating face seal, a fluid bearing, a gas bearing, or a film riding seal.

3. The rotary machine of claim 1, wherein the opening cover and the opening of the high-pressure aspiration conduit form an air pocket therebetween.

4. The rotary machine of claim 1, wherein the wear protection assembly further comprises a weld structure securing the opening cover on the slider face over the opening.

5. The rotary machine of claim 1, wherein the opening is at an outlet of a secondary airflow channel of the high-pressure aspiration conduit, the secondary airflow channel being in fluid communication with a primary airflow channel of the high-pressure aspiration conduit.

6. The rotary machine of claim 1, wherein the portion of the seal rotor is a primary tooth of the seal rotor.

7. The rotary machine of claim 1, wherein the abradable covering has a thickness less than a thickness of the air bearing wall of the seal slider.

8. A rotary machine, comprising:
a stator;
a rotor configured to rotate with respect to the stator, the rotor being arranged with the stator at a rotor-stator interface; and
a seal assembly at the rotor-stator interface, the seal assembly comprising:
a seal cavity defined by a seal rotor and a seal slider of a seal stator, the seal rotor defining a rotor face, the seal slider defining a slider face and an air bearing wall, wherein the seal slider comprises a high-pressure aspiration conduit;
at least one non-contacting seal interface; and
a wear protection assembly comprising an abradable covering positioned over an opening of at least one hole extending partially through a thickness of the rotor face such that a seal-side of the at least one hole is covered during non-contacting conditions,
wherein, during operation of the rotary machine, and upon the seal rotor and the seal stator making contact with each other at the rotor-stator interface such that the seal cavity is at least partially closed, allowing a portion of the seal slider to abrade the abradable covering to expose the opening, thereby allowing airflow to enter the at least one hole to pressurize a trench cavity defined by the at least partially closed seal cavity and the slider face of the seal cavity, wherein the pressurized trench cavity is configured to at least partially reopen the seal cavity,
wherein the wear protection assembly further comprises an opening cover arranged between the opening of the at least one hole and the abradable covering.

9. The rotary machine of claim 8, wherein the seal assembly is configured as at least one of an aspirating face seal, a fluid bearing, a gas bearing, or a film riding seal.

10. The rotary machine of claim 8, wherein the opening cover and the opening of the at least one hole form an air pocket therebetween.

11. The rotary machine of claim 8, wherein the wear protection assembly further comprises a weld structure securing the opening cover on the slider face over the opening.

12. The rotary machine of claim 8, wherein the abradable covering has a thickness less than a thickness of the air bearing wall of the seal slider.

13. A rotary machine, comprising:
a stator;
a rotor configured to rotate with respect to the stator; and
a member coupled to or formed integrally with the stator or the rotor, the member defining a high-pressure aspiration conduit and comprising a wear surface, the member including an abradable covering positioned over an opening of the high-pressure aspiration conduit, the abradable covering configured to wear during an operation of the stator and the rotor to allow a high pressure airflow through the opening, wherein the member further comprises an opening cover arranged between the opening of the high-pressure aspiration conduit and the abradable covering.

14. The rotary machine of claim 13, wherein the abradable covering comprises successive layers of abradable material.

\* \* \* \* \*